(12) United States Patent
Yap

(10) Patent No.: US 11,614,673 B2
(45) Date of Patent: Mar. 28, 2023

(54) NONLINEAR OPTICAL WAVEGUIDE STRUCTURES FOR LIGHT GENERATION AND CONVERSION

(71) Applicant: The Boeing Company, Chicago, IL (US)

(72) Inventor: Daniel Yap, Malibu, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/450,046

(22) Filed: Oct. 5, 2021

(65) Prior Publication Data
US 2022/0107548 A1    Apr. 7, 2022

Related U.S. Application Data

(60) Provisional application No. 63/088,220, filed on Oct. 6, 2020, provisional application No. 63/201,661, filed
(Continued)

(51) Int. Cl.
*G02F 1/365* (2006.01)
*G02F 1/35* (2006.01)
(Continued)

(52) U.S. Cl.
CPC .............. *G02F 1/365* (2013.01); *G02F 1/3501* (2013.01); *G02F 1/3534* (2013.01);
(Continued)

(58) Field of Classification Search
CPC .............. G02F 1/35; G02F 1/365; G02F 1/37; G02F 1/377; G02F 1/39; G02B 6/12; G02B 6/293
See application file for complete search history.

(56) References Cited

U.S. PATENT DOCUMENTS 3,842,289 A * 10/1974 Yariv .................... G02F 1/3775
                                                            359/332
5,002,349 A    3/1991 Cheung et al.
(Continued)

FOREIGN PATENT DOCUMENTS

CN    110333637 A    10/2019
JP    H01134309 A    5/1989
(Continued)

OTHER PUBLICATIONS

Lumerical, "Lithium Niobate Nonlinear Thermal Waveguide", published online at https://optics.ansys.com/hc/en-us/articles/360047509134-Lithium-Niobate-Nonlinear-Thermal-Waveguide, 19 pages (Year: 2022).*
(Continued)

*Primary Examiner* — Daniel Petkovsek
(74) *Attorney, Agent, or Firm* — Yee & Associates, P.C.

(57) ABSTRACT

An optical waveguide structure comprising a nonlinear optical waveguide, a central region, a first side region, and a second side region. The central region is located within the nonlinear optical waveguide, wherein the central region comprises a nonlinear optical material. The first side region is on a first side of the central region and the second side region is on a second side of the central region. The nonlinear optical material comprising the central region has a first nonlinear coefficient that is larger than a second nonlinear coefficient of a second material comprising the first side region and the second side region.

26 Claims, 16 Drawing Sheets

Related U.S. Application Data on May 7, 2021, provisional application No. 63/201,664, filed on May 7, 2021.

(51) Int. Cl.
    *G02F 1/39* (2006.01)
    *G02F 1/377* (2006.01)
    *G02F 1/37* (2006.01)

(52) U.S. Cl.
    CPC .............. *G02F 1/3536* (2013.01); *G02F 1/37* (2013.01); *G02F 1/377* (2013.01); *G02F 1/39* (2013.01); *G02F 1/395* (2013.01); *G02F 1/392* (2021.01)

(56) References Cited

U.S. PATENT DOCUMENTS

| | | | |
|---|---|---|---|
| 5,206,868 A | 4/1993 | Deacon | |
| 5,295,218 A | 3/1994 | Agostinelli et al. | |
| 5,875,272 A | 2/1999 | Kewitsch et al. | |
| 5,999,548 A * | 12/1999 | Mori | G02F 1/365 372/18 |
| 6,078,717 A | 6/2000 | Nashimoto et al. | |
| 6,081,632 A | 6/2000 | Yoshimura et al. | |
| 6,269,205 B1 | 7/2001 | Peral et al. | |
| 6,438,291 B1 | 8/2002 | Duck et al. | |
| 6,445,848 B1 | 9/2002 | Islam et al. | |
| 6,483,953 B1 | 11/2002 | McBrien et al. | |
| 6,721,481 B2 * | 4/2004 | Terahara | H04B 10/2916 359/341.1 |
| 7,262,902 B2 | 8/2007 | Burns et al. | |
| 7,266,258 B2 | 9/2007 | Liu et al. | |
| 7,495,823 B2 | 2/2009 | Kanner et al. | |
| 8,173,982 B2 * | 5/2012 | Edamatsu | G02F 1/39 356/417 |
| 9,291,837 B1 | 3/2016 | Yap | |
| 9,798,219 B2 | 10/2017 | Pant et al. | |
| 10,372,014 B1 | 8/2019 | Vidrighin et al. | |
| 10,451,951 B1 | 10/2019 | Yap et al. | |
| 10,698,292 B1 * | 6/2020 | Nagano | G02F 1/365 |
| 11,003,046 B2 | 5/2021 | Liscidini et al. | |
| 11,092,875 B2 | 8/2021 | Xu et al. | |
| 11,221,540 B2 | 1/2022 | Srinivasan et al. | |
| 2005/0047702 A1 | 3/2005 | Parker et al. | |
| 2006/0132901 A1 | 6/2006 | Miller | |
| 2012/0093459 A1 | 4/2012 | Mathai et al. | |
| 2014/0193155 A1 | 7/2014 | Popovic et al. | |
| 2018/0031949 A1 | 2/2018 | Mookherjea et al. | |
| 2019/0361315 A1 | 11/2019 | Zhou | |
| 2020/0256722 A1 | 8/2020 | Najafi et al. | |
| 2021/0026222 A1 | 1/2021 | Nagano | |
| 2022/0107548 A1 | 4/2022 | Yap | |

FOREIGN PATENT DOCUMENTS

| | | |
|---|---|---|
| JP | H01134310 A | 5/1989 |
| JP | H05107577 A | 4/1993 |
| JP | H05216079 A | 8/1993 |
| JP | H10319444 A | 12/1998 |
| JP | 2017078786 A | 4/2017 |
| WO | 2019208582 A1 | 5/2021 |

OTHER PUBLICATIONS

Bosshard, "Cascading of second-order nonlinearities in polar materials," Advanced Materials, vol. 8, No. 5, May 1, 1996, pp. 385-397.
Boyd, "Nonlinear Optics," Third Edition, Academic Press, Mar. 28, 2008, pp. 69-133.
Cai et al., "Integrated optics on single-crystal lithium niobate thin film: some recent progress," 18th International Conference on Transparent Optical Networks ICTON, Jul. 2016, paper Tu.D5.5, pp. 1-4.
Chen et al., "Modal phase matched lithium niobate nanocircuits for integrated nonlinear photonics," OSA Continuum, vol. 1, No. 1, Sep. 2018, pp. 229-242.
Doerr, "Planar Lightwave Devices for WDM," Optical Fiber Telecommunications, vol. IVA, Jan. 1, 2002, pp. 405-476.
Fan et al., "290 Hz intrinsic linewidth from an integrated optical chip-based widely tunable InP—Si3N4 hybrid laser," Digest 2017 Conference on Lasers and Electro-Optics CLEO, May 2017, paper JTh5C.9, pp. 1-2.
Fejer et al., "Quasi-phase-matched second harmonic generation tuning and tolerances," IEEE Journal of Quantum Electronics, vol. 28, No. 11, Nov. 1992, pp. 2631-2654.
Gad et al., "Compound ring resonator circuit for integrated optics applications," Journal Optical Society America A, vol. 26, No. 9, Sep. 9, 2009, pp. 2023-2032.
Halir et al., "Compact High-Performance Multimode Interference Couplers in Silicon-on-Insulator," IEEE Photonics Technology Letters, vol. 21, No. 21, Nov. 1, 2009, pp. 1600-1602.
Helt et al., "How does it scale? Comparing quantum and classical nonlinear optical processes in integrated devices," Journal of the Optical Society of America B, vol. 29, No. 8, Aug. 1, 2012, pp. 2199-2212.
Lin et al., "Broadband Quasi-Phase-Matched Harmonic Generation in an On-Chip Monocrystalline Lithium Niobate Microdisk Resonator," Phys. Rev. Lett., vol. 122, No. 17, May 3, 2019, pp. 173903, 5 pages.
Lin et al., "Characterization of hybrid InP-TriPleX photonic integrate tunable lasers based on silicon nitride (Si3N4/SiO2) microring resonators for optical coherent systems," IEEE Photonics Journal, vol. 10, No. 3, Jun. 2018, pp. 1400108, 9 pages.
Luo et al., "On-chip second-harmonic generation and broadband parametric down-conversion in a lithium niobate microresonator," Optics Express, vol. 25, No. 20, Oct. 2, 2017, pp. 24531-24539.
Luo et al., "Semi-nonlinear nanophotonic waveguides for highly efficient second-harmonic generation," Sep. 17, 2018, 8 pages, accessed Mar. 30, 2022, available at https://arxiv.org/abs/1809.06476.
Lu et al., "Chip-integrated visible-telecom entangled photon pair source for quantum communication," Nature Physics, vol. 15, Jan. 21, 2019, pp. 373-381, available at https://doi.org/10.1038/s41567-018-0394-3.
Matsushita et al., "Quasi-phase-matched parametric fluorescence in a periodically inverted GaP waveguide," Applied Physics Express, vol. 2, No. 6, May 22, 2009, pp. 061101.
May et al., "Second-harmonic generation in AlGaAs-on-insulator waveguides," Optics Letters, vol. 44, No. 6, Mar. 15, 2019, pp. 1339-1342.
Pasiskevicius et al., "Quasi-phase matched nonlinear media: Progress towards nonlinear optical engineering," Optical Materials, vol. 34, No. 3, Jul. 22, 2011, pp. 513-523.
Pernice et al., "Second harmonic generation in phase matched aluminum nitride waveguides and micro-ring resonators," Applied Physics Letters, vol. 100, No. 22, May 30, 2012, pp. 223501.
Rao et al., "Second-harmonic generation in periodically-poled thin film lithium niobate wafer-bonded on silicon," Optics Express, vol. 24, No. 26, Dec. 26, 2016, pp. 29941-29947.
Rao et al., "Second-harmonic generation in single-mode integrated waveguides based on mode-shape modulation," Applied Physics Letters, vol. 110, No. 11, Jan. 19, 2017, pp. 111109.
Schunemann et al., "Optical parametric oscillation in quasi-phase-matched GaP," Proc SPIE, Nonlinear Frequency Generation and Conversion: Materials, Devices, and Applications XIV, vol. 9347, Mar. 24, 2015, pp. 93470J.
Spencer et al., "Low kappa, narrow bandwidth Si3N4 Bragg gratings," Optics Express, vol. 23, No. 23, Nov. 16, 2015, pp. 30329-30336.
Thomson et al., "Low Loss MMI Couplers for High Performance MZI Modulators," IEEE Photonics Technology Letters, vol. 22, No. 20, Oct. 15, 2010, pp. 1485-1487.
Tison et al., "Path to increasing the coincidence efficiency of integrated resonant photon sources," Optics Express, vol. 25, No. 26, Dec. 25, 2017, pp. 33088-33096.

(56) References Cited

OTHER PUBLICATIONS

Wang et al., "Ultrahigh-efficiency wavelength conversion in nanophotonic periodically poled lithium niobate waveguides," Optica, vol. 5, No. 11, Nov. 7, 2018, pp. 1438-1441.

Wang et al.,"Second harmonic generation in nano-structured thin-film lithium niobate waveguides," Optics Express, vol. 25, No. 6, Mar. 2017, pp. 6963-6973.

Yang et al., "Realization of controllable photonic molecule based on three ultrahigh-Q microtoroid cavities", Laser & Photonics Reviews, vol. 11, No. 2, Januaray 16, 2017, paper 1600178, 8 pages.

Yoo et al., "Wavelength conversion by difference frequency generation in AlGaAs waveguides with periodic domain inversion achieved by wafer bonding," Applied Physics Letters, vol. 68, No. 19, May 6, 1996, pp. 2609-2611.

Yu et al., "Efficient continuous wave second harmonic generation pumped at 1.55 µm in quasi-phasematched AlGaAs waveguides," Optics Express, vol. 13, No. 26, Dec. 26, 2005, pp. 10742-10748.

International Search Report dated Jan. 11, 2022, regarding application No. PCT/US2021/071721, 4 pages.

Written Opinion of the International Searching Authority dated Jan. 11, 2022, regarding application No. PCT/US2021/071721, 7 pages.

International Search Report dated Jan. 14, 2022, regarding application No. PCT/US2021/071722, 5 pages.

Written Opinion of the International Searching Authority dated Jan. 14, 2022, regarding application No. PCT/US2021/071722, 6 pages.

International Search Report dated Feb. 8, 2022, regarding application No. PCT/US2021/071723, 5 pages.

Written Opinion of the International Searching Authority dated Feb. 8, 2022, regarding application No. PCT/US2021/071723, 8 pages.

International Search Report and Written Opinion of the International Searching Authority dated Feb. 9, 2022, regarding application No. PCT/US2021/071725, 24 pages.

International Search Report and Written Opinion of the International Searching Authority dated Feb. 28, 2022, regarding application No. PCT/US2021/071725, 24 pages.

Clark et al., "Depositing Light in a Photonic Stop Gap by Use of Kerr Nonlinear Microresonators," Optics Letters, vol. 28, No. 10, 2003, pp. 1966-1968.

Non-Final Office Action dated Aug. 10, 2022, regarding U.S. Appl. No. 17/450,031, 29 pages.

* cited by examiner

NONLINEAR OPTICAL WAVEGUIDE STRUCTURES FOR LIGHT GENERATION AND CONVERSION

CROSS-REFERENCE TO RELATED APPLICATIONS

This application is related to and claims the benefit of priority of provisional U.S. Patent Application Ser. No. 63/088,220, entitled "Directional Phase Matching (DPM) Optical Waveguide", filed on Oct. 6, 2020; provisional U.S. Patent Application Ser. No. 63/201,661, entitled "Directional Phase Matching Optical Waveguide", filed on May 7, 2021; and provisional U.S. Patent Application Ser. No. 63/201,664, entitled "Nonlinear Optical Waveguide Structures for Light Generation and Conversion", filed on May 7, 2021, all of which are hereby incorporated by reference.

BACKGROUND INFORMATION

1. Field

The present disclosure relates generally to optical waveguide structures and, in particular, to optical waveguides with nonlinear optical materials.

2. Background

Optical waveguides are physical structures that guide electromagnetic waves in an optical spectrum. Optical waveguides can be used as components in integrated optical circuits. With respect to quantum communications and processing, nonlinear optical material structures can be used to create photon transmitters, repeaters, and other quantum devices for communications. Nonlinear optical structures can be used to change the light passing through them depending on factors such as orientation, temperature, wavelength of light, polarization of light, and other factors.

For example, a waveguide with light of a blue wavelength passing through the waveguide can generate one or more photons of light that has a longer wavelength, such as green or red, and a correspondingly lower photon energy. This type of conversion can be performed using waveguides that incorporate a nonlinear optical material having a second order or third order nonlinear optical susceptibility.

Current waveguides and structures that implement nonlinear optical processes are not as efficient as desired. Therefore, it would be desirable to have a method and apparatus that take into account at least some of the issues discussed above, as well as other possible issues. For example, it would be desirable to have a method and apparatus that overcome a technical problem with increasing the efficiency of nonlinear optical processes using optical waveguides with nonlinear optical materials.

SUMMARY

An embodiment of the present disclosure provides an optical waveguide structure comprising a nonlinear optical waveguide, a central region, a first side region, and a second side region. The central region is located within the nonlinear optical waveguide, wherein the central region comprises a nonlinear optical material. The first side region is on a first side of the central region and the second side region is on a second side of the central region. The nonlinear optical material comprising the central region has a first nonlinear coefficient that is larger than a second nonlinear coefficient of a second material comprising the first side region and the second side region.

Another embodiment of the present disclosure provides method for moving a light through a nonlinear optical waveguide structure. A light at a pump wavelength is input into the nonlinear optical waveguide structure having a central region within a nonlinear optical waveguide in the nonlinear optical waveguide structure; a first side region of a first side of the central region; and a second side region on a second side of the central region. The central region comprises a nonlinear optical material and the central region has a first nonlinear coefficient that is larger than a second nonlinear coefficient of the first side region and the second side region. The light at the pump wavelength is propagated along a path in the optical waveguide structure, wherein light generation occurs in the nonlinear optical waveguide.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
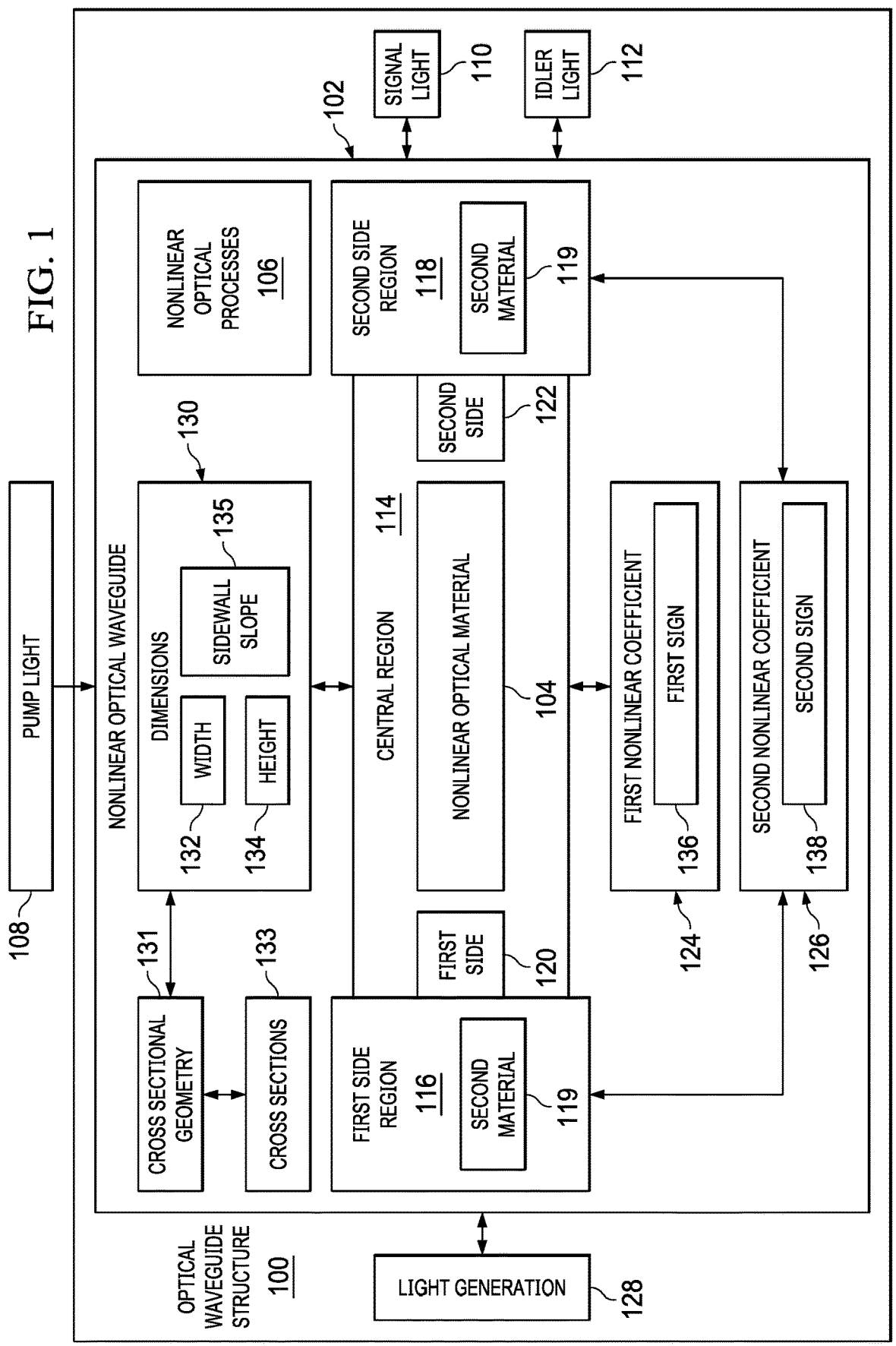
FIG. 1 is an illustration of a block diagram of an optical waveguide structure in accordance with an illustrative embodiment.

The illustrative embodiments recognize and take into account one or more different considerations. For example, the illustrative embodiments recognize and take into account that when light propagates through an optical waveguide, the light may have different wavelengths. The illustrative embodiments recognize and take into account that the light of the shortest wavelength, such as a pump light, can have a propagation mode such as a transverse electric (TE) 31 mode, which is a higher order mode. The illustrative embodiments recognize and take into account that the light of other wavelengths traveling through an optical waveguide can have a fundamental mode such as TE 11. The illustrative embodiments recognize and take into account that the light of the other wavelengths can be a signal light or an idler light generated within the optical waveguide as a result of the pump light traveling through the optical waveguide.

The illustrative embodiments recognize and take into account that the configuration of a nonlinear optical waveguide can affect the efficiency of generating at least one of a signal light or an idler light. As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The illustrative embodiments recognize and take into account that it is desirable to avoid light of a particular wavelength having a first sign and a second sign that are opposite of each other. The illustrative embodiments recognize and take into account that the sign is for the amplitude of an electric field component of the light. The illustrative embodiments recognize and take into account that this condition can result in the nonlinear optical interaction of the light of one or more wavelengths being canceled or partially canceled.

Thus, the illustrative embodiments provide a method, apparatus, and system for moving light in optical waveguides with a desired level of light generation. In one illustrative example, an optical waveguide structure comprises a nonlinear optical waveguide with a central region, a first side region, and a second side region located within the nonlinear optical waveguide. The central region comprises a nonlinear optical material. The first side region is located on a first side of the central region. The second side region is located on a second side of the central region. The central region has a first nonlinear coefficient that is larger than a second nonlinear coefficient of the first side region and the second side region.

With reference now to the figures and, in particular, with reference to FIG. 1, an illustration of a block diagram of an optical waveguide structure is depicted in accordance with an illustrative embodiment. In this illustrative example, optical waveguide structure 100 comprises nonlinear optical waveguide 102 that comprises nonlinear optical material 104.

In this illustrative example, a number of nonlinear optical processes 106 can occur within nonlinear optical waveguide 102. As used herein, a "number of," when used with reference, to items means one or more items. For example, a "number of nonlinear optical processes 106" is one or more of nonlinear optical processes 106. Different nonlinear optical processes in nonlinear optical processes 106 can occur in different locations or regions within nonlinear optical waveguide 102.

The nonlinear optical processes 106 can be three-wave mixing and four-wave mixing processes that generate light. For example, nonlinear optical process 106 can include at least one of spontaneous parametric down conversion (SPDC) and spontaneous four-wave mixing (SFWM). These nonlinear optical processes can generate light. Nonlinear optical process 106 also can include second harmonic generation, third harmonic generation, sum frequency generation and difference frequency generation. For example, pump light 108 can be input into nonlinear optical waveguide 102. Nonlinear optical processes 106 can generate at least one of signal light 110 or idler light 112 in response to pump light 108 propagating through nonlinear optical material 104 in nonlinear optical waveguide 102.

In this illustrative example, pump light 108, signal light 110, and idler light 112 are lights of different wavelengths. In this illustrative example, pump light 108 can have a wavelength that is shorter than the wavelength of signal light 110 and idler light 112.

In this illustrative example, the structure of nonlinear optical waveguide 102 can be configured to increase light generation by nonlinear optical processes 106. As depicted, nonlinear optical waveguide 102 comprises central region 114, first side region 116, and second side region 118.

In this example, first side region 116 is on first side 120 of central region 114. Second side region 118 is on second side 122 of central region 114. In this illustrative example, first side 120 is opposite of second side 122. In other words, first side region 116 and second side region 118 are on opposite sides of central region 114.

As depicted, central region 114 comprises nonlinear optical material 104. For example, central region 114 can be comprised of at least one of lithium niobate (LiNbO$_3$), silicon carbide, aluminum nitride, gallium nitride, gallium aluminum nitride, gallium phosphide, gallium aluminum phosphide, aluminum phosphide, gallium arsenide, gallium aluminum arsenide, aluminum arsenide, or some other suitable material.

First side region 116, and second side region 118 comprise second material 119. In this illustrative example, first side region 116 and second side region 118 can be comprised of second material 119 whose second-order nonlinear coefficient is smaller as compared to the second-order nonlinear coefficient of the nonlinear optical material 104 in central region 114 such that the nonlinear optical process is weaker and generates less light or does not generate light. In other words, nonlinear optical process in first side region 116 and second side region 118 does not generates less light or no light because the nonlinear optical process is weaker. For example, second material 119 in first side region 116 and second side region 118 can be selected from at least one of silicon nitride, titanium dioxide silicon, silicon oxynitride, hafnia, or other suitable materials.

Nonlinear optical material 104 in central region 114 and second material 119 in first side region 116 and second side region 118 can generate light through other processes, such as direct emission of light.

In this example, nonlinear optical material 104 comprising the central region has first nonlinear coefficient 124 that is larger than second nonlinear coefficient 126 of second material 119 comprising first side region 116 and the second side region 118. In this illustrative example, second nonlinear coefficient 126 can be selected such that a nonlinear optical interaction is reduced to about zero in first side region 116 and second side region 118. In other words, second nonlinear coefficient 126 can be selected such that first side region 116 and second side region 118 have a reduced contribution to light generation 128.

For example, nonlinear optical material 104 can be a first nonlinear optical material that has first nonlinear coefficient 124 in the form of a first second-order nonlinear coefficient with a magnitude that is at least one picometer/volt. First side region 116 and second side region 118 can be a second nonlinear optical material that has second nonlinear coefficient 126 in the form of a second second-order nonlinear coefficient whose magnitude is equal to or less than one third the magnitude of the first second-order nonlinear coefficient for the first nonlinear optical material.

In this illustrative example, this configuration of regions extends through some or all of nonlinear optical waveguide 102. This configuration of central region 114, first side region 116, and second side region 118 can provide a desired level of light generation 128 within nonlinear optical waveguide 102.

As depicted, central region 114 has a set of dimensions 130 selected to increase light generation 128 in optical waveguide structure 100. In this example, light generation 128 is increased in nonlinear optical waveguide 102 in optical waveguide structure 100. In one illustrative example, the set of dimensions 130 can be selected from at least one of width 132, height 134, sidewall slope 135, or some other dimension.

For example, width 132 can be for central region 114. As another illustrative example, width 132 can be for first side region 116, central region 114, and second side region 118. As yet another illustrative example, height 134 can be for central region 114. In still another illustrative example, height 134 can be for first side region 116, central region 114, and second side region 118. In another illustrative example, at least one of first side 120 or second side 122 for central region 114 can have a sidewall slope 135, which can be defined as an angle.

As depicted, the set of dimensions 130 can be for the cross-section geometry 131 of nonlinear optical waveguide 102. Cross-sectional geometry 131 includes a set of dimensions 130 that describe a set of cross-sections 133 in nonlinear optical waveguide 102.

As used herein, a "set of," when used with reference to items, means one or more items. For example, a "set of dimensions 130" is one or more of dimensions 130.

The set of dimensions 130 can be selected such that light generation 128 increases for at least one of a signal light 110 or idler light 112 when pump light 108 travels through nonlinear optical waveguide 102. For example, in the set of dimensions 130, width 132 can be selected to increase an overlap of an electromagnetic field for a light of interest with the central region such that light generation 128 is increased in nonlinear optical waveguide 102. The light of interest can be pump light 108, signal light 110 or idler light 112.

For example, width 132 can selected to increase an overlap of the electromagnetic field that has a first sign for the light of interest within central region 114 and the electromagnetic field has a second sign for the light of interest in first side region 116 and second side region 118 such that light generation 128 is increased within nonlinear optical waveguide 102. The light of interest can be at least one of pump light 108, signal light 110, or idler light 112.

In this illustrative example, electric field amplitude of a first light traveling in nonlinear optical waveguide 102 has first sign 136 in nonlinear optical waveguide 102 in central region 114 while having second sign 138 in first side region 116 and second side region 118. In other words, the sign is of the electric field amplitude of the light traveling through the different regions in nonlinear optical waveguide 102.

In this illustrative example, the first light is the light that has the shortest wavelength of the lights of different wavelengths traveling through nonlinear optical waveguide 102. For spontaneous parametric down conversion (SPDC), the first light is pump light 108. For second harmonic generation, the first light can be the generated light such as signal light 110 and idler light 112, which are both the second harmonic light. For spontaneous four-wave mixing (SFWM), the first light can be signal light 110.

When first sign 136 is positive, second sign 138 is negative. When first sign 136 is negative, second sign 138 is positive. In this illustrative example, these signs are for the amplitude of the electric field. Nonlinear optical waveguide can be designed to reduce or avoid the amplitude of electric field of first light having both the first sign and the second sign in central region 114.

In the illustrative example, the sign of the electric field component of first light in the central region 114 versus the sign the electric field component of first light in the side regions, first side region 116 and second side region 118, affect light generation 128. In other words, these two signs are opposite signs to each other.

By reducing second nonlinear coefficient 126 in first side region 116 and second side region 118, the contribution to a nonlinear optical process from these side regions do not detract from the contribution to a nonlinear optical process from central region 114. As a result, increased efficiency in light generation can occur using nonlinear optical waveguide 102 with central region 114, first side region 116, and second side region 118.

The illustration of optical waveguide structure 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, optical waveguide structure 100 include other components such as an optical coupler that couples nonlinear optical waveguide 102 to other optical waveguides. In another illustrative example, other structures can be present in nonlinear optical waveguide 102 in addition to central region 114, first side region 116, and second side region 118. For example, a substrate in nonlinear optical waveguide 102 can be present on which these structures are formed.

Detailed embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive.

Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

For purposes of the description hereinafter, the terms "upper," "lower," "right," "left," "vertical," "horizontal," "top," "bottom," and derivatives thereof shall relate to the embodiments of the disclosure, as it is oriented in the drawing figures. The terms "positioned on" means that a first element, such as a first structure, is present on a second element, such as a second structure, wherein intervening elements, such as an interface structure, such as an interface layer, may be present between the first element and the second element.

In this disclosure, when an element, such as a layer, region, or substrate is referred to as being "on" or "over" another element, the element can be directly on the other element or intervening elements can also be present. In contrast, when an element is referred to as being "directly on", "directly over", or "on and in direct contact with" another element, intervening elements are not present, and the element is in contact with the other element.

The processes, steps, and structures described below do not form a complete process flow for manufacturing integrated circuits. The disclosure can be practiced in conjunction with integrated circuit fabrication techniques currently used in the art, and only so much of the commonly practiced process steps are included as necessary for an understanding of the different examples of the present disclosure. The figures represent cross sections of a portion of an integrated circuit during fabrication and are not drawn to scale, but instead are drawn so as to illustrate different illustrative features of the disclosure.

Figure 2:
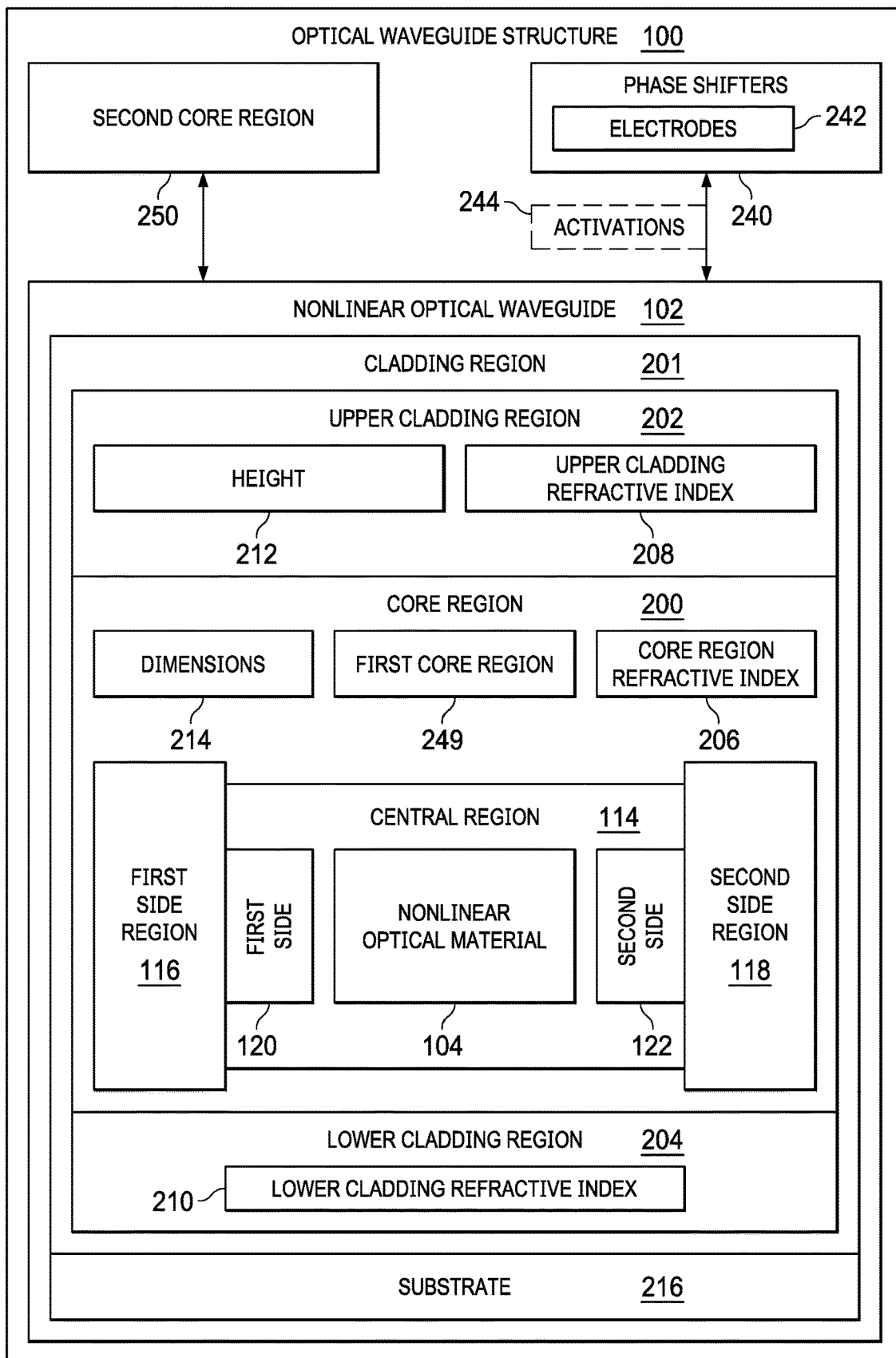
FIG. 2 is an illustration of a block diagram of a configuration for an optical waveguide structure in accordance with an illustrative embodiment.

Turning next to FIG. 2, an illustration of a block diagram of a configuration for an optical waveguide structure is depicted in accordance with an illustrative embodiment. In the illustrative examples, the same reference numeral may be used in more than one figure. This reuse of a reference numeral in different figures represents the same element in the different figures.

As depicted in this example, nonlinear optical waveguide 102 comprises core region 200 and cladding region 201. In this example, cladding region 201 is comprised of a dielectric material and core region 200 is located within cladding region 201. The dielectric material can be selected to have a smaller refractive index relative to the refractive index of core region 200. The dielectric material of cladding region 201 can be selected from at least one of a silicon dioxide, a polymer, air, or other suitable material.

As depicted, cladding region 201 can be comprised of lower cladding region 204, and upper cladding region 202. As depicted, core region 200 is located between lower cladding region 204 and upper cladding region 202. In this depicted example, the terms "upper" and "lower" are used to indicate relative locations of components with respect to each other. In this example, "upper" and "lower" can be relative locations on a structure in a vertical position. In a cross-sectional configuration, "upper" and "lower" are relative vertical positions. Left side and right side are relative horizontal positions.

Core region 200 can comprise a single spatially-uniform material and have a single value of its refractive index for a given wavelength of light. In this example, core region 200 also can comprise a spatially non-uniform material that is better described by a "net refractive index" whose value can be determined by the spatially varied refractive index distribution of that material.

A number of different components can form core region 200. In this illustrative example, central region 114, first side region 116, and second side region 118 are components that form core region 200.

In this illustrative example, core region 200 has core region refractive index 206, and upper cladding region 202 has upper cladding refractive index 208 that is lower than core region refractive index 206. As depicted, lower cladding region 404 has lower cladding refractive index 210 that is lower than core region refractive index 206.

In another illustrative example, upper cladding region 202 has height 212 that can be selected to compensate for a variation of the phase walk-off in the nonlinear optical waveguide. In this illustrative example, upper cladding region 202 can have height 212 selected to compensate for a variation in a set of dimensions 214 in core region 200 which can be one cause in the variation of the phase walk-off in the nonlinear optical waveguide.

For example, height 212 for upper cladding region 202 can be adjusted during fabrication to compensate for a variation in the set of dimensions 214 for core region 200 from an as-designed value for the set of dimensions 214. In this illustrative example, the set of dimensions 214 can be, for example, a width or a height of core region 200, the width or the height of central region 114, or the width or the height of first side region 116 or second side region 118. As depicted, height 212 of upper cladding region 202 can be sufficiently small that adjustments of height 212 can affect the effective refractive indices of the nonlinear waveguide modes.

In this illustrative example, lower cladding region 204 can be located on substrate 216. Substrate 216 can be comprised of various materials depending on the implementation. For example, substrate 216 can comprise a set of materials selected from at least one of lithium niobate, silicon carbide, sapphire, quartz, alumina, silicon, germanium, or other suitable types of materials. Substrate 216 can be located on a wafer that is processed using fabrication equipment for semiconductor processing.

The illustration of structures for nonlinear optical waveguide 102 is provided to illustrate one manner in which nonlinear optical waveguide 102 can be implemented. This illustration is not meant to limit the manner in which nonlinear optical waveguide 102 can be configured in other illustrative examples. For example, cladding region 201 may be a single component rather than having upper cladding region 202 and lower cladding region 204. Additionally, core region 200 is shown as a component located between upper cladding region 202 and lower cladding region 204. In other illustrative examples, core region 200 can be located within upper cladding region 202, lower cladding region 204, or both of these regions in cladding region 201.

In the illustrative example, a set of phase shifters 240 can be present in optical waveguide structure 100 and used with nonlinear optical waveguide 102. The set of phase shifters 240 can be, for example, a set of electrodes 242. The set of electrodes 242 can be used to affect the manner in which light propagates through the nonlinear optical waveguide 102. For example, the set of electrodes 242 can be used to change the phase of a light of a particular wavelength propagating through nonlinear optical waveguide 102 or other types of optical waveguides.

Although in this illustrative example, the set of phase shifters 240 has been described as a set of electrodes 242, other types of phase shifters may be used in addition to or in place of the set of electrodes 242 in other illustrative examples. For example, the set of phase shifters 240 can be a set of elements that is selected from at least one of a thermal element, shape memory alloy element, piezo electric element, or some other element that can emit energy to change the phase of a light of a particular wavelength propagating through nonlinear optical waveguide 102. The elements can also have different shapes and configurations selected to provide a desired change the phase of a light of a particular wavelength propagating through nonlinear optical waveguide 102 or other types of optical waveguides.

The set of electrodes 242 or other elements can apply a set of activations 244 that can take a number of different forms. For example, the set of activations can be selected from at least one of a voltage, a current, a thermal energy, an electrically induced strain, or some other type of energy that can be applied to an optical waveguide to affect the manner in which light propagates through nonlinear optical waveguide 102. In particular, the energy can be used to affect the phase of a light of the particular wavelength propagating through nonlinear optical waveguide 102.

Further, core region 200 can be first core region 249, and second core region 250 can be present within optical waveguide structure 100. In this illustrative example, second core region 250 can have different configurations.

For example, second core region 250 can have the same configuration as core region 200. In another example, second core region 250 may only have a central region that may be a nonlinear optical material or may not be a nonlinear optical material.

Figure 3:
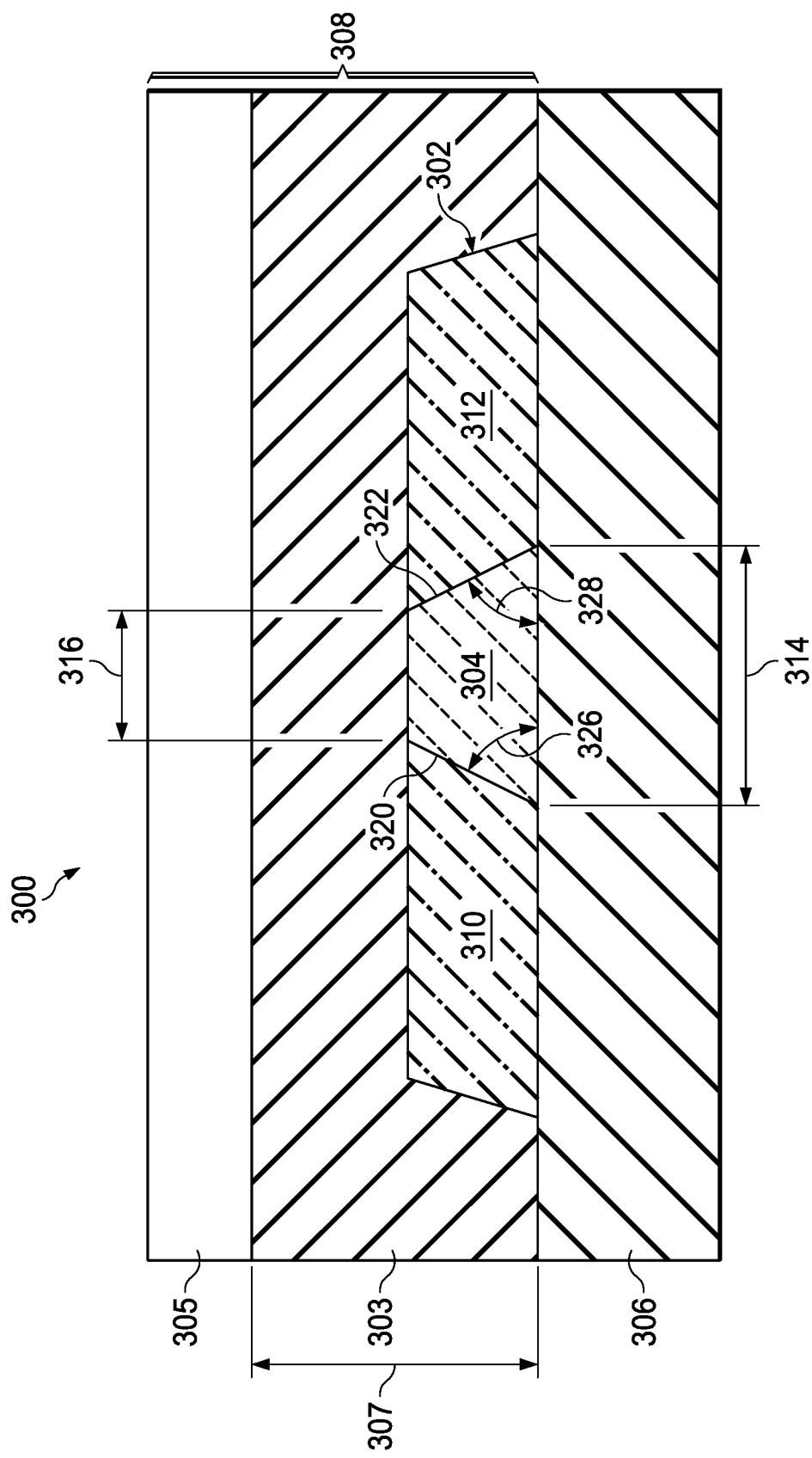
FIG. 3 is an illustration of a cross-sectional view of a nonlinear optical waveguide in an optical waveguide structure in accordance with an illustrative embodiment.

With reference now to FIG. 3, an illustration of a cross-sectional view of a nonlinear optical waveguide in an optical waveguide structure is depicted in accordance with an illustrative embodiment. Nonlinear optical waveguide 300 is an example of an implementation for nonlinear optical waveguide 102 shown in block form in FIG. 1 and in FIG. 2.

In this illustrative example, nonlinear optical waveguide 300 has core region 302. In this illustrative example, core region 302 comprises a nonlinear optical material, such as x-cut lithium niobate ($LiNbO_3$). As depicted, nonlinear optical waveguide 300 also has cladding regions.

Nonlinear optical waveguide 300 has lower cladding region 306 and upper cladding region 308. In this depicted example, the cladding regions can comprise at least one of silicon dioxide, air, or other suitable materials.

In this example, lower cladding region 306 is comprised of silicon oxide ($SiO_2$). As depicted, a first portion of upper cladding region 308 is comprised of silicon dioxide 303 and a second portion of upper cladding region 308 is comprised of air 305. As depicted, silicon dioxide in upper cladding region 308 has upper cladding region height 307.

Although upper cladding region 308 is depicted as being silicon dioxide 303 and air 305, upper cladding region 308 can take other forms in other illustrative examples. For example, upper cladding region 308 can be comprised of just silicon dioxide or air instead of an air and silicon dioxide combination.

Further, as depicted in this cross-sectional view, nonlinear optical waveguide 300 has side regions on either side of central region 304 that form core region 302. As depicted, these two side regions are located laterally adjacent to central region 304. In this illustrative example, the side regions comprise first side region 310 and second side region 312, which are comprised of silicon nitride ($Si_3N_4$).

As depicted, nonlinear optical waveguide 300 has strip width 314. In this cross-sectional view of nonlinear optical waveguide 300, the cross-section of central region 304, first side region 310, and second side region 312 has strip width 314 that is selected to cause a phase matching condition.

Additionally, central region 304 in nonlinear optical waveguide 300 has center region top width 316. As depicted, center region top width 316 can be selected to increase an overlap of an electromagnetic field for a light of interest with central region 304 such that light generation is increased in nonlinear optical waveguide 300. As another illustrative example, sidewall 320 and sidewall 322 for central region 304 can have a side slope defined by angle 326 and angle 328.

In this illustrative example, silicon nitride can be a suitable material for first side region 310 and second side region 312 because silicon nitride has a minimal second-order optical nonlinearity and the refractive index of silicon nitride is slightly smaller than the refractive index of lithium niobate, the nonlinear optical material used in central region 304. In this depicted example, the refractive index of silicon nitride can be less than 10% smaller than the refractive index of lithium niobate.

As depicted, nonlinear optical waveguide 300 can be especially suitable for modal phase matching in which the shortest wavelength of the light involved in the nonlinear optical process is in the $TE_{xy}=TE_{31}$ mode (or in the $TM_{xy}=TM_{31}$ mode). For this nomenclature, the x-axis of the cross-section is in the horizontal direction and the y-axis of the cross-section is in the vertical direction. These axes are reference directions in a cross-sectional depiction and are not necessarily the same as the X, Y, and Z axes of a lithium niobate crystal. For a spontaneous parametric down conversion nonlinear optical process, a pump light has the shortest wavelength (highest energy) and is in the $TE_{31}$ mode.

The illustration of nonlinear optical waveguide 300 is provided as an example of one implementation for nonlinear optical waveguide 102 shown in block form in FIG. 1 and FIG. 2. This illustration is not meant to limit the manner in which nonlinear optical waveguide 300 can be implemented in other illustrative examples. For example, a layer of a material comprising first side region 310, second side region 312, or some other material can be located over at least one of central region 304, first side region 310, or second side region 312.

Figure 4:
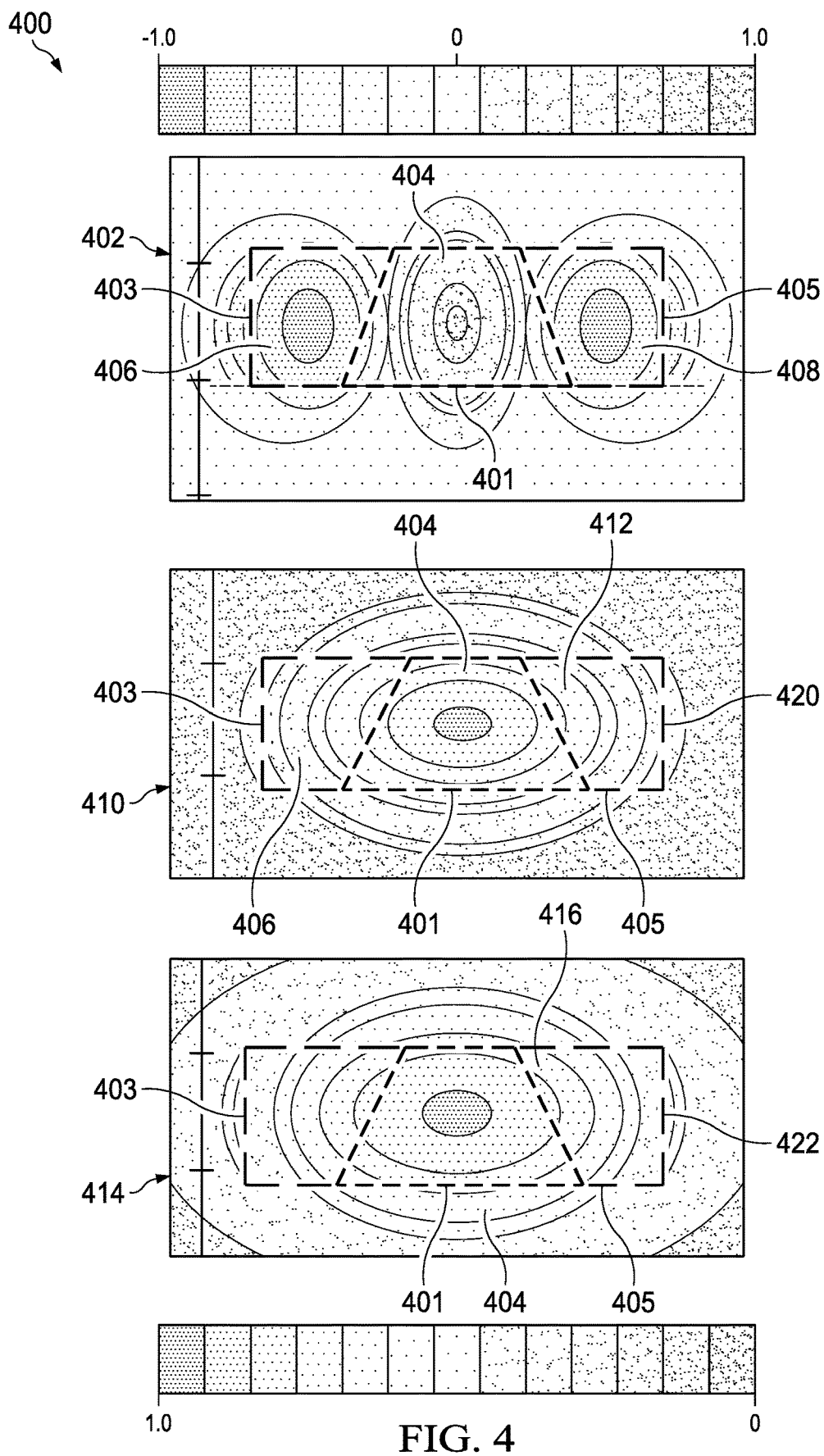
FIG. 4 is an illustration of field profiles in a nonlinear optical waveguide in accordance with an illustrative embodiment.

With reference now to FIG. 4, an illustration of field profiles in a nonlinear optical waveguide is depicted in accordance with an illustrative embodiment. As depicted, field profiles 400 are for light in a nonlinear optical waveguide, such as nonlinear optical waveguide 300 in FIG. 3. In this illustrative example, the pump light is in the $TE_{31}$ mode and the signal light and the idler light are in the $TE_{11}$ (or fundamental) mode.

As depicted in field profile 402, the $TE_{31}$ pump mode in a cross-section of nonlinear optical waveguide 102 has 3 lobes, center lobe 404, side lobe 406, and side lobe 408. The magnitude of the electric field amplitude is largest near the central portions of these lobes as seen in field profile 402. For a higher-order mode of the waveguided light, such as the $TE_{31}$ pump mode, the amplitude of the electric field can have a positive value or a negative value, as seen in field profile 402.

Also, the electric field amplitude distribution can have a large magnitude (having a value close to +1 or −1) or can have a small magnitude (having a value close to 0). The portions of the electric field amplitude distribution having a large magnitude can be called the lobes of the electric field distribution.

As depicted, field profile 402 is for an optical field within core region 302, which is formed by central region 304, first side region 310, and second side region 312 in FIG. 3. In this illustrative example, central region 304 is shown by outline 401, first side region 310 is shown by outline 403, and second side region 312 is shown by outline 405.

In this depicted example profile, the center lobe 404 overlaps the nonlinear optical material in central region 304 in nonlinear optical waveguide 300 in which central region 304 is shown by outline 401. Side lobe 406 overlaps first side region 310 as shown by outline 403 for first side region 310. As depicted, lobe 416 overlaps second side region 312 as shown by outline 405 for second side region 312.

In this illustrative example, center lobe 404 has an amplitude with a sign that is positive. In contrast, side lobe 406 and side lobe 408, have amplitudes of the opposite sign, in which the signs are negative.

Electric field profile 410 for the signal light has lobe 412, and electric field profile 414 for the idler light has lobe 416. The electric field profiles or spatial distributions illustrate the waveguide modes for the signal and idler light in a given cross-section for nonlinear optical waveguide 300. Field profile 410 and field profile 414 each have one peak, or lobe, for the electric field amplitudes. As depicted in field profile 410 and field profile 414, peak amplitudes of signal and idler electric fields have a positive sign.

As depicted, field profile 410 is shown for a signal light optical field within core region 302 as shown by outline 420. In this illustrative example, field profile 414 is shown for a signal light optical field within core region 302 as shown by outline 422.

For purposes of illustration, the entire waveguide cross-section can be assumed to be comprised of a nonlinear optical material. For example, first side region 310, second side region 312, and central region 304 can all comprised of a nonlinear optical material. For example, nonlinear optical material can have $d_{NL}<0$, i.e. $d_{NL}$ is a negative value.

In the illustrative example, equation (2) below can be considered for the spatial combination of the three electric field peaks in the pump mode shown in field profile 402. These three electric field peaks are center lobe 404, side lobe 406, and side lobe 408 in field profile 402 for the pump light. The rate of generation of signal light contributed by the center lobe is positive using equation (2) below. Because the signal and idler modes have electric fields amplitude that peak in the center of nonlinear optical waveguide in this example, the central region will have the greatest contribution to the rate of signal generation.

Considering now the contributions to equation (2) below from the two side peaks of the pump mode, the rate of generation of signal light is negative in this example. The electric field amplitude of the pump mode has one sign in center lobe 404, and opposite signs on side lobe 406 and side lobe 408. In this illustrative example, the amplitude of the idler field has the same sign across all of nonlinear optical waveguide 300. As a result, the contribution to the generation of a signal light and an idler light has one sign in the center of nonlinear optical waveguide 300 in central region 304, and an opposite sign for the sides of nonlinear optical waveguide 300 in first side region 310 and second side region 312.

Because the electric field amplitude of the pump mode has one sign in the center lobe, and opposite signs in the side lobes, but the amplitude of the lobe(s) of the electric field amplitude of the idler mode has the same sign across the entire structure, the contribution to the rate of generation of signal light will have one sign for the center of the structure, and the opposite sign for the sides of the structure. In the illustrative example, difference in the sign of the electric field amplitude in different regions of the nonlinear optical waveguide 300 results in the difference in the sign of the contribution those regions make to the rate of generation of signal light.

Thus, the light generation contributed by the side regions, first side region 310 and second side region 312, versus central region 304 is a competitive process. Because the amplitudes of idler electric fields (and also of signal electric fields for the case of spontaneous parametric down conversion (SPDC)) are relatively weak in first side region 310 and second side region 312, the magnitude of the contribution to light generation by these side regions is smaller than the magnitude of the contribution to light generation by central region 304.

Next, when first side region 310 and second side region 312 are comprised of a material that has little-to-no nonlinearity in the depicted examples the rate of light generation of a signal light and an idler light contributed by the side regions is effectively zero, according to equation (2) below. In this illustrative example, $d_{effNL} \approx 0 d_{effNL} \approx 0$ in the two side regions.

Thus, the rate of light generation of the signal light (and also of the idler light in the case of spontaneous parametric down conversion (SPDC)) in nonlinear optical waveguide 300 can be dominated by the rate of light generation of the signal light (and also of idler light in the case of spontaneous parametric down conversion (SPDC)) in central region 304 of nonlinear optical waveguide 300. In this example, center lobe 404 of the pump light mode in field profile 402 most strongly overlaps with the idler modes in field profile 414 (and for the case of spontaneous parametric down conversion (SPDC), also with the signal modes in field profile 410).

In this illustrative example, the side lobes in field profile 402 for the pump mode do not detract from the rate of light generation of signal light, and idler light, or both in nonlinear optical waveguide 300 because these side lobes, side lobe 406 and side lobe 408, do not significantly overlap a material with a large nonlinear coefficient. Thus, the competition between contributions from different spatial regions to the nonlinear optical process can be significantly reduced, if not entirely eliminated.

In this example, using all 3 lobes of the pump mode shown in field profile 402 for the nonlinear process results in a cancellation of the contributions from different spatial regions to nonlinear optical processes. This cancellation can occur because of the differing signs of electric field amplitude in the differing pump mode lobes such as side lobe 406 and side lobe 408 versus center lobe 404.

With nonlinear optical waveguide 300, the side lobes of the pump mode in field profile 402 are located in a material that has low nonlinearity relative to the nonlinearity of central region 304. As a result, the contribution of central region 304 in nonlinear optical waveguide 300 with high nonlinearity level is not cancelled by the contribution from the side lobes of the pump mode in field profile 402, which would otherwise subtract from the contribution of central region 304 to the nonlinear optical process. The first nonlinear optical coefficient in central region 304 and second nonlinear optical coefficient in first side region 310 and second side region 312 can be selected to have relative values to provide a desired level of light generation or light generation rate in nonlinear optical waveguide 300.

Figure 5:
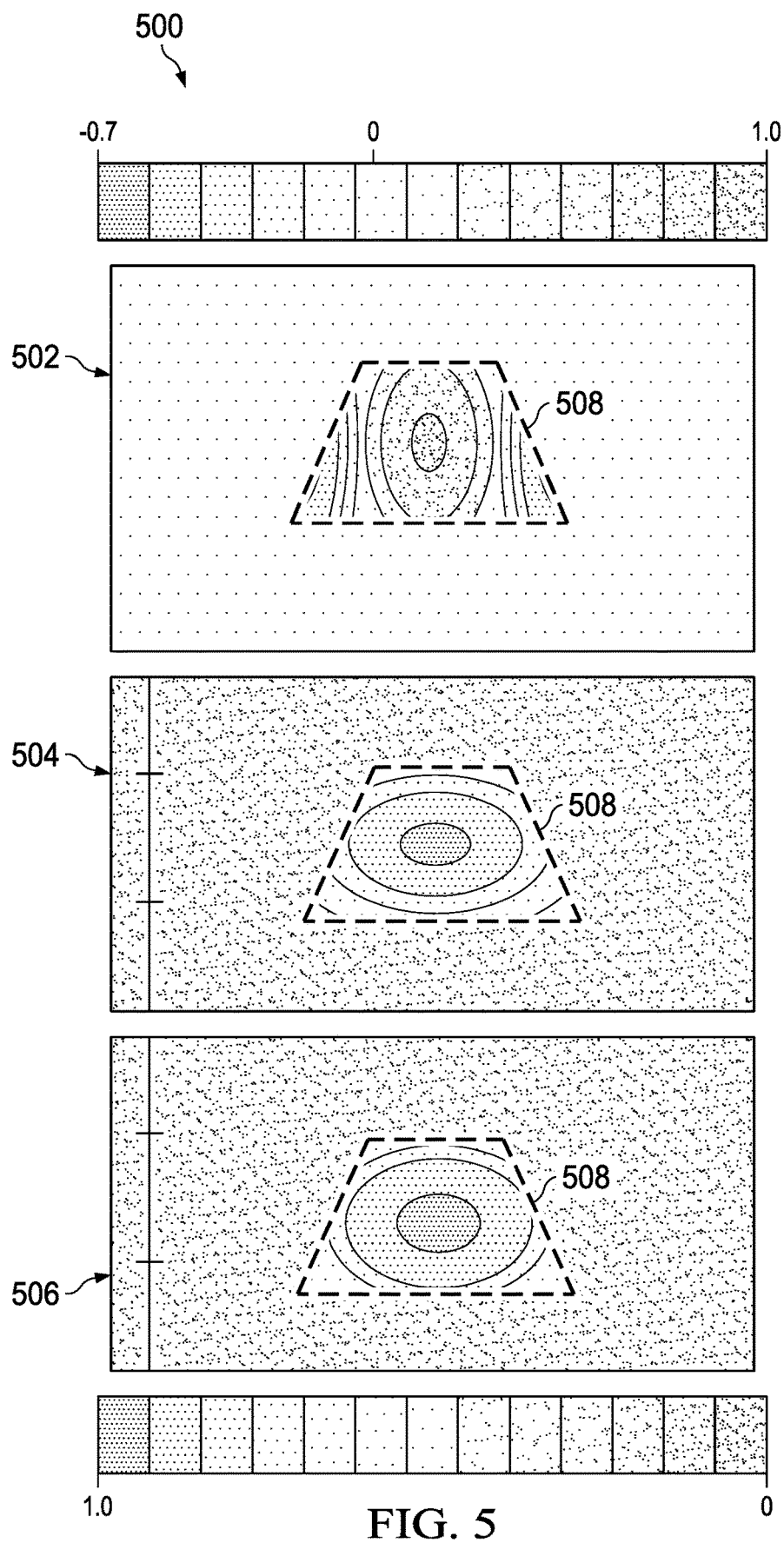
FIG. 5, an illustration of field profiles in central region of a nonlinear optical waveguide as depicted in accordance with an illustrative embodiment.

Turning next to FIG. 5, an illustration of field profiles in central region of a nonlinear optical waveguide is depicted in accordance with an illustrative embodiment. As depicted, field profiles 500 are for a central region such as central region 304 in nonlinear optical waveguide 300 in FIG. 3.

As depicted, field profile 502 is for a pump light optical field, field profile 504 is for a signal light optical field, field profile 506 is for an idler light optical field. In the illustrative example, these field profiles are for central region 304 as indicated outline 508 in field profiles 500. The fields illustrative within outline 508 in the different field profiles are the portions of the optical fields that are involved in a nonlinear optical process that generates light in nonlinear optical waveguide 300.

In nonlinear optical waveguide 300 in FIG. 3, the rate of generation of signal light from pump light and idler light in an exemplary second-order nonlinear optical process of difference frequency generation can be described by the coupled-wave equation, given below for signal light:

$$\frac{dA_s}{dz} = d_{eff} A_p A_i^* \frac{i2\pi}{n_s \lambda_s} e^{i\Delta k z} \quad (1)$$

where $A_s$ is the electric field amplitude of signal light 110, $A_p$ is the electric field amplitude of pump light 108, $A^*_i$ is the complex conjugate of electric field amplitude of idler light 112, $d_{eff}$ is the effective nonlinear optical coefficient, $\lambda_s$ is the vacuum wavelength of the signal light, $n_s$ is the effective refractive index of the signal light propagating in nonlinear optical waveguide 300, $\Delta k$ is the wavevector mismatch, z is the distance propagated by the optical fields, and i is imaginary unit ($i^2 = -1$).

In this example, $n_s$ is the effective refractive index for the signal light. The "effective" nonlinear optical coefficient $d_{eff}$ is described by the values for first nonlinear coefficient in central region 304 and second nonlinear coefficient in first side region 310 and second side region 312, as well as by the spatial distributions of the optical fields. In the illustrative example, "optical field" is the propagating electromagnetic field of the light.

In the depicted example, the dimensions describing the cross-section geometry for nonlinear optical waveguide 300 can be selected to meet a particular phase-matching condition, or value for $$\Delta k = 2\pi \left( \frac{n_p}{\lambda_p} - \frac{n_i}{\lambda_i} - \frac{n_s}{\lambda_s} \right),$$

which depends on the particular implementation. The first three factors as well as the wave-vector mismatch in the exponential on the right-hand-side of equation (1) are terms of interest in light generation for nonlinear optical waveguide 300. For any point along the longitudinal dimension z of the waveguide, the generation of the signal light will depend on the transverse or spatial variation of the nonlinear optical coefficient in the waveguide's cross-sectional structure and on the spatial variation of the electric fields for the pump light and the idler light. These spatial variations are described in the spatially integrated value for $d_{eff}$, $$\frac{dA_s}{dz} \propto d_{eff} = \int \int d_{NL} u_p u_i \, dx \, dy \quad (2)$$

In equation (2), $d_{NL}$ is the nonlinear optical coefficient of the material, and can have a different value different for different spatial regions of the waveguide; $u_p$ is the normalized electric field distribution for the pump light and $u_i$ is the normalized electric field distribution for the idler light. The integration can be performed over the transverse or cross-sectional dimensions.

The electric field distributions shown in FIG. 5 are only those portions for which the waveguide material has a value for $d_{NL}$ that is non zero. Only these portions of the electric field distributions contribute to the result of the integration done to obtain the value for $d_{eff}$ as describe by equation (2).

Figure 6:
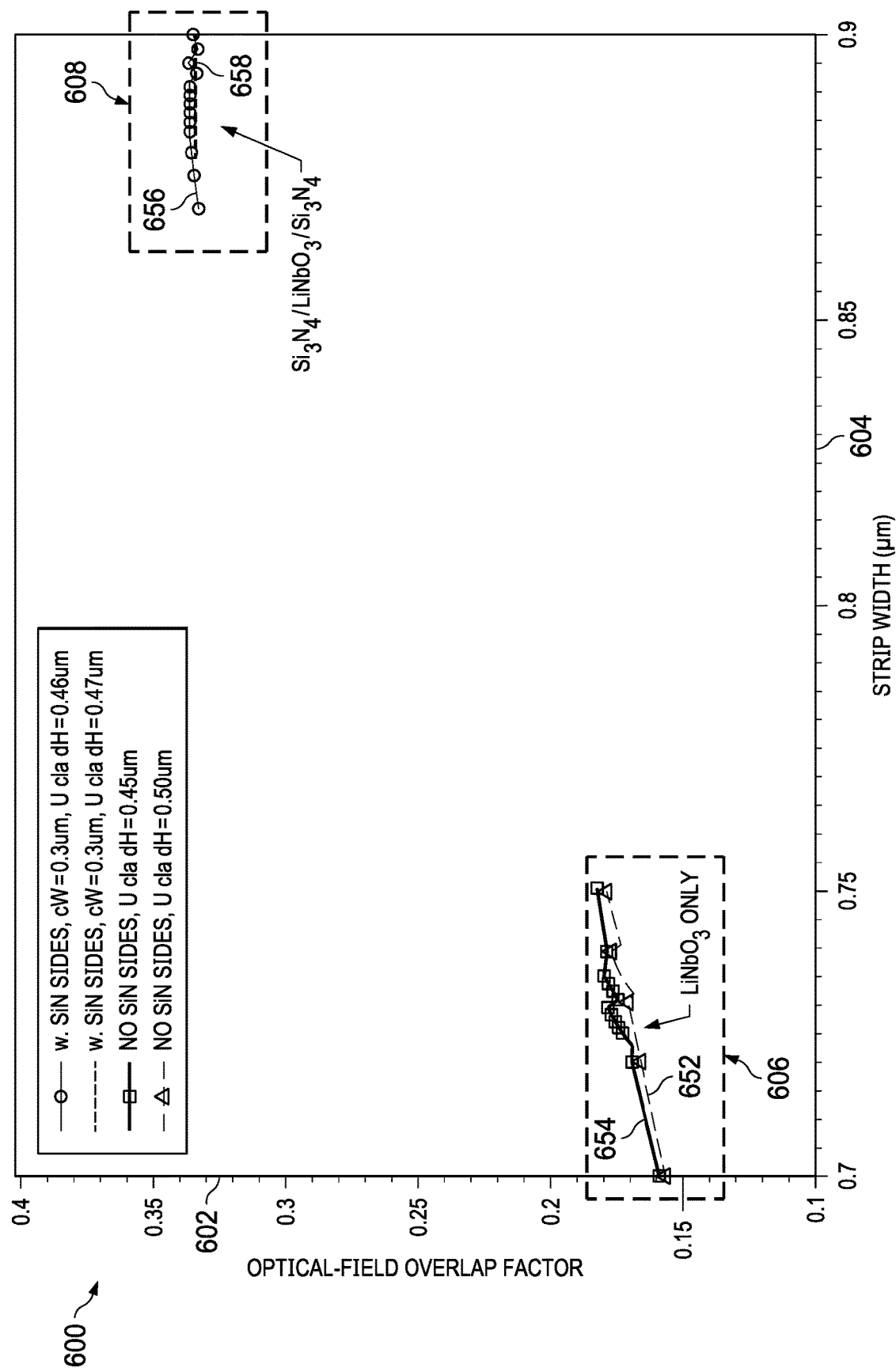
FIG. 6 is an illustration of a graph of an optical field overlap factor for different configurations of nonlinear optical waveguides in accordance with an illustrative embodiment.

Turning now to FIG. 6, an illustration of a graph of an optical field overlap factor for different configurations of nonlinear optical waveguides is depicted in accordance with an illustrative embodiment. In this illustrative example, graph 600 illustrates an optical field overlap factor as a function of strip width. In this illustrative example, graph 600, represents optical field overlap factors generated after performing the integration in equation (2) with a normalized value of 0 or 1 for the material nonlinear optical coefficient $d_{NL}$. The normalized value is one when the optical field is within outline 401 or outline 508 and is 0 when the optical field is outside of this outline 401 or outline 508 as depicted in FIG. 4 and FIG. 5.

In this example, y-axis 602 represents the optical field overlap factor, and x-axis 604 represents strip width in micrometers. The lines in graph 600 illustrate values of the optical field overlap factor obtained for various configurations of nonlinear optical waveguides.

The lines in section 606 are obtained using a material with a low value or normalized to 0 for material nonlinear optical coefficient $d_{NL}$.

As depicted, the lines in section 606 depict optical field overlap factors for nonlinear optical waveguides that have a spatially uniform lithium niobate core region, whose normalized nonlinear optical coefficient has a value of 1. In section 606, line 652 is for a waveguide with a spatially uniform lithium niobate core region and an upper cladding height of 0.50 μm, and line 654 is for a waveguide with a spatially uniform lithium niobate core region and an upper cladding height of 0.45 μm. In this example, the lines in section 606 result from a nonlinear optical waveguide whose core region comprises spatially uniform lithium niobate and does not have any side regions.

In this illustrative example, the lines in section 608 illustrate optical field overlap factors for nonlinear optical waveguides whose core region comprises a central region and two side regions. The lines in section 608 are obtained when the central region has a normalized nonlinear optical coefficient $d_{hL}$ equal to 1 and the two side regions have a normalized nonlinear optical coefficient $d_{NL}$ equal to 0.

Figure 7:
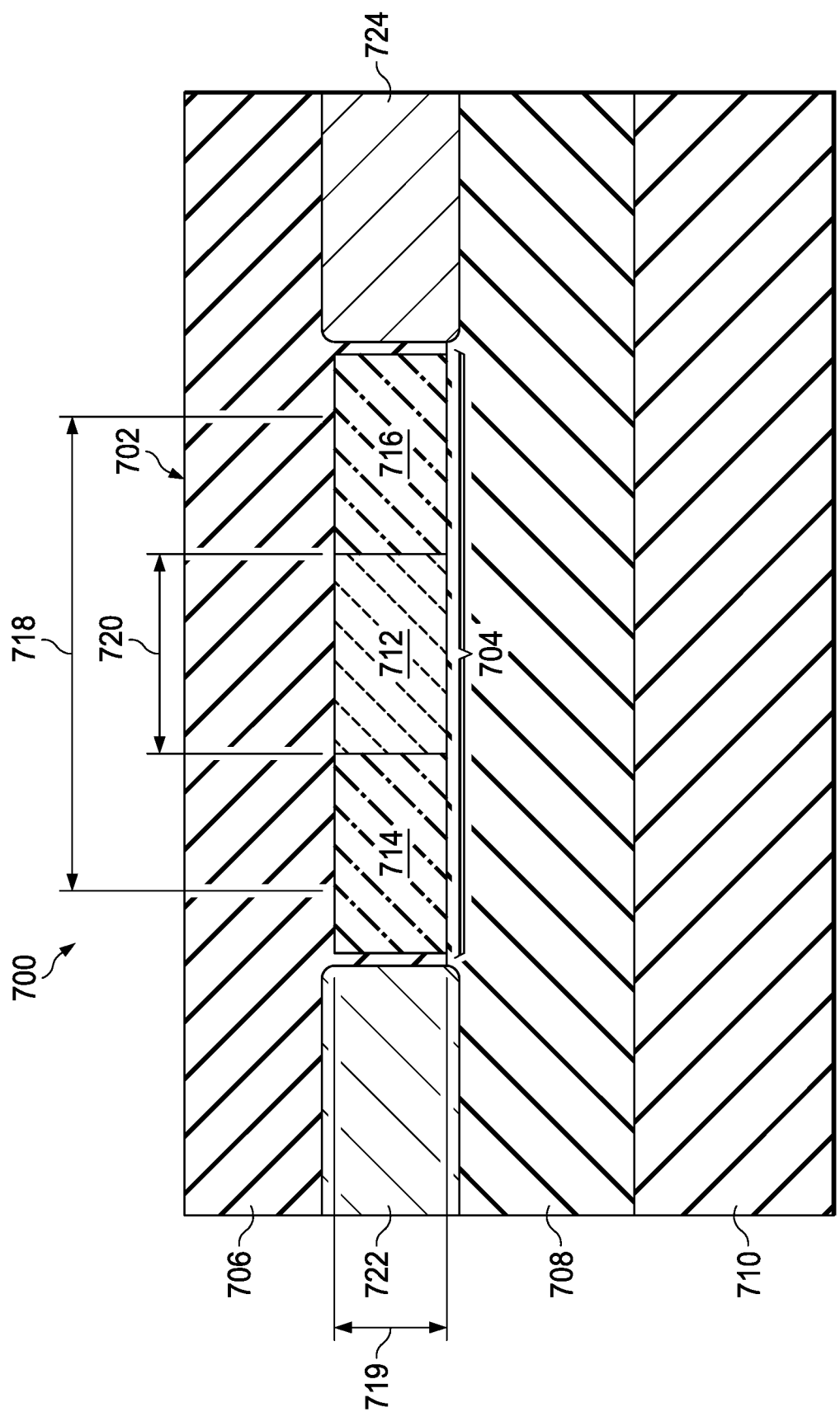
FIG. 7 is an illustration of a cross-sectional view of an optical waveguide structure with electrodes in accordance with an illustrative embodiment.
Figure 9:
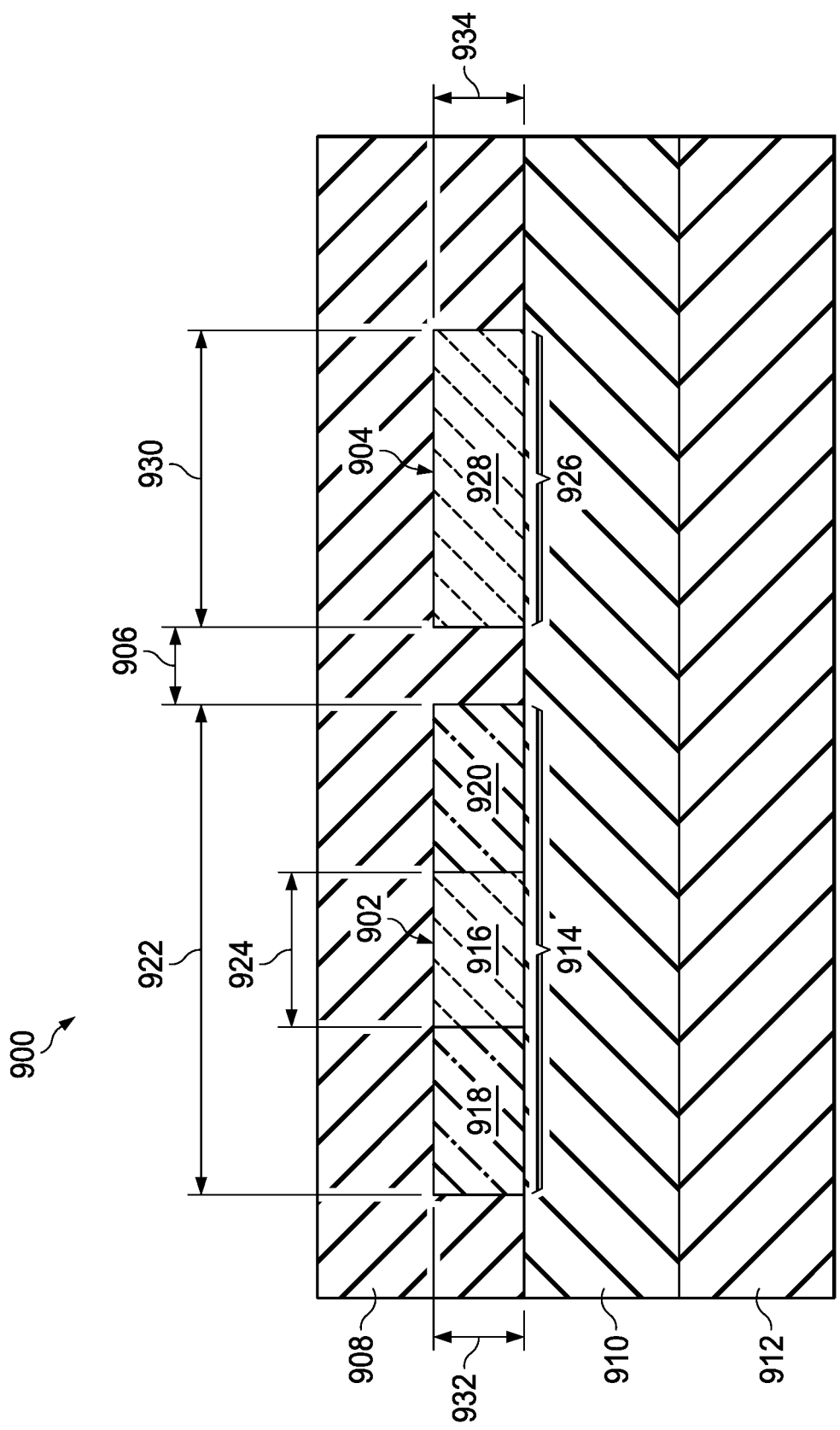
FIG. 9 is another illustration of a cross-sectional view of an optical waveguide structure with a two-core region in accordance with an illustrative embodiment.
Figure 10:
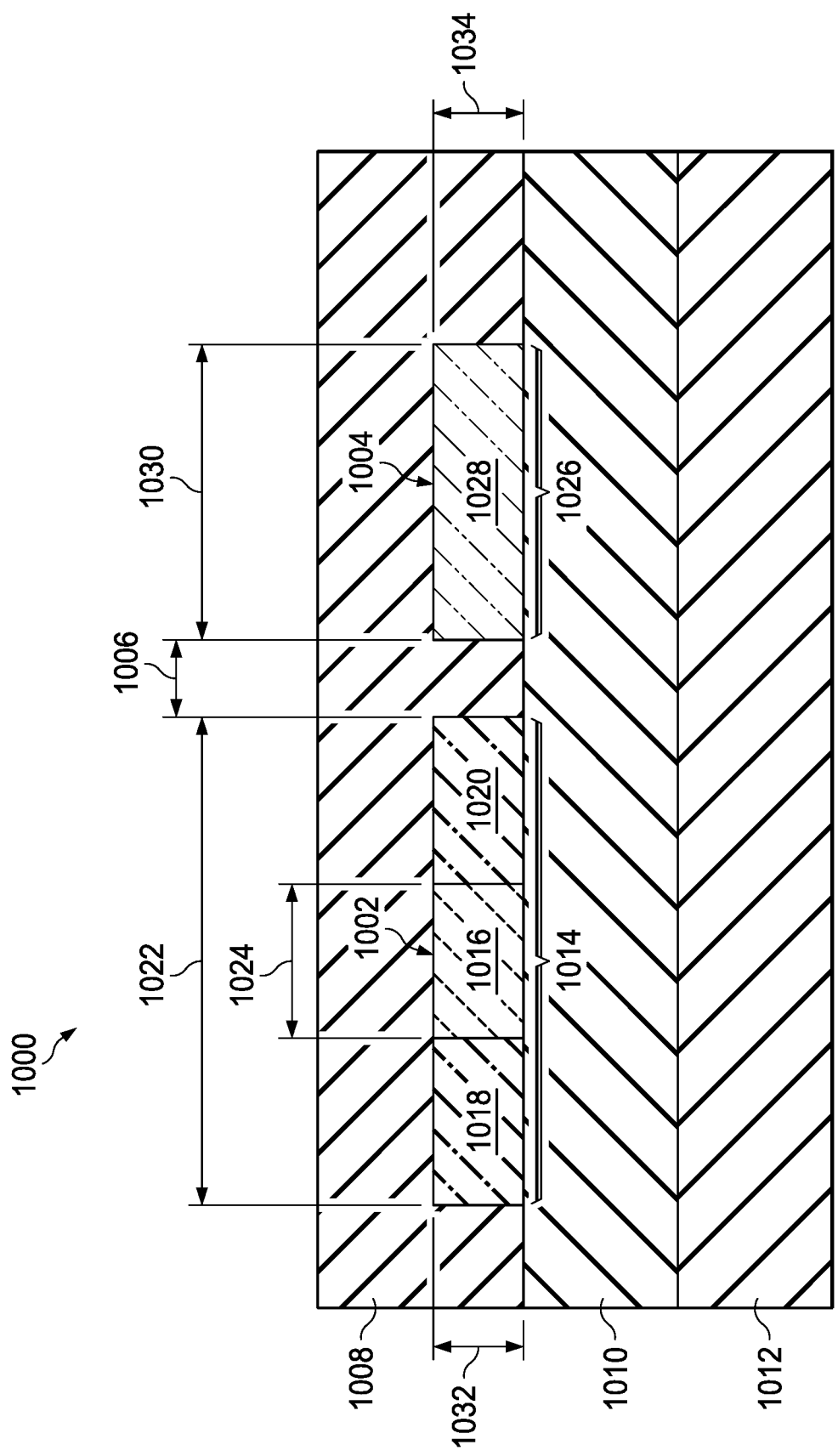
FIG. 10 is yet another illustration of a cross-sectional view of an optical waveguide structure with a two-core region in accordance with an illustrative embodiment.

Examples of these types of waveguides include nonlinear optical waveguide 102 in FIG. 1, nonlinear optical waveguide 300 in FIG. 3, nonlinear optical waveguide 702 in FIG. 7, nonlinear optical waveguide 902 in FIG. 9, and nonlinear optical waveguide 1002 in FIG. 10. These nonlinear optical waveguides can have a lithium niobate center region and silicon nitride side regions.

In section 608, line 656 is for a nonlinear optical waveguide with a center region width of 0.3 µm and an upper cladding height of 0.46 µm; and line 658 is for a nonlinear optical waveguide with a lithium niobate center region and silicon nitride side regions having a center region width of 0.3 µm and an upper cladding height of 0.47 µm.

In the illustrative examples, the generation of light in the nonlinear optical waveguides depends on the square of the optical field overlap factor. As a result, increasing the optical field overlap factor results in an increase in the generation of light such as at least one of a signal light or an idler light from a pump light propagating through the nonlinear optical waveguide.

The selection of values for the center width for a central region with side regions as depicted in the illustrative examples can result in an optical field overlap factor that provides greater performance in light generation as compared to current nonlinear optical waveguides as can be seen by the difference in the optical field overlap factor in section 608 and section 606.

Turning now to FIG. 7, an illustration of a cross-sectional view of an optical waveguide structure with electrodes is depicted in accordance with an illustrative embodiment. Optical waveguide structure 700 is an example of an implementation for optical waveguide structure 100 in FIG. 1 and FIG. 2.

In this illustrative example, optical waveguide structure 700 comprises nonlinear optical waveguide 702, electrode 722, and electrode 724. Nonlinear optical waveguide 702 is an example of an implementation for nonlinear optical waveguide 102 shown in block form in FIG. 1 and in FIG. 2.

In this illustrative example, nonlinear optical waveguide 702 comprises core region 704, upper cladding region 706, and lower cladding region 708. Lower cladding region 708 is formed on a silicon substrate 710. As depicted, upper cladding region 706 and lower cladding region 708 are formed using an oxide ($SiO_2$).

As depicted, core region 704 comprises central region 712, first side region 714, and second side region 716. In this illustrative example, central region 712 is comprised of lithium niobate ($LiNbO_3$). First side region 714 and second side region 716 are comprised of silicon nitride ($Si_3N_4$).

As depicted, core region 704 has strip width 718, and central region 712 has center width 720. Core region 704 also has strip height 719.

These dimensions can be selected to obtain desired propagation of light through nonlinear optical waveguide 702. For example, at least one of strip width 718 or strip height 719 can be selected to obtain a desired phase matching condition or a desired value for the wave-vector mismatch Δk. Center width 720 can be selected to increase an overlap of a first portion of an electromagnetic field having a first sign for a light of interest within central region 712 and such that a second portion of an electromagnetic field having the second sign is located in first side region 714, and second side region 716 such that light generation is increased in nonlinear optical waveguide 702.

In this illustrative example, optical waveguide structure 700 also includes electrode 722 and electrode 724. As depicted, electrode 722 and electrode 724 form an optical waveguide structure that can function as an optical phase shifter that can shift the phases of the electromagnetic fields of light traveling through nonlinear optical waveguide 702. The fields can be, for example, transverse electric (TE) fields or transverse magnetic (TM) fields. In other illustrative examples, a single electrode can be located in proximity to the waveguide core region. In yet other illustrative examples, a third electrode can be placed over core region 704 and upper cladding region 706. In yet another illustrative example, electrode 722 or electrode 724 can be fabricated to extend over core region 704.

Figure 8:
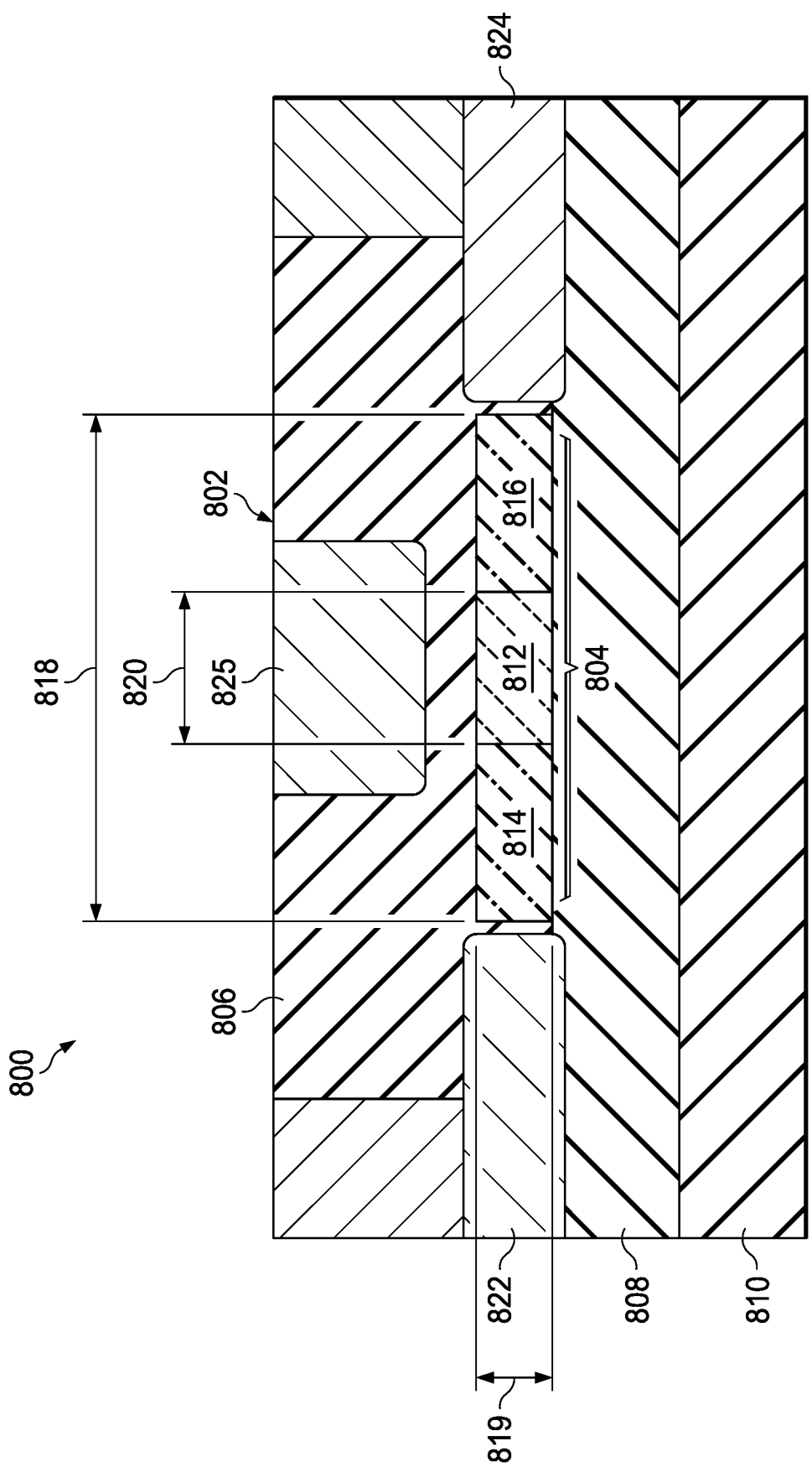
FIG. 8 is an illustration of a cross-sectional view of an optical waveguide structure in accordance with an illustrative embodiment.

Turning now to FIG. 8, an illustration of a cross-sectional view of an optical waveguide structure is depicted in accordance with an illustrative embodiment. Optical waveguide structure 800 is an example of an implementation for optical waveguide structure 100 in FIG. 1.

In this illustrative example, optical waveguide structure 800 comprises nonlinear optical waveguide 802, electrode 822, electrode 824, and electrode 825. Nonlinear optical waveguide 802 is an example of an implementation for nonlinear optical waveguide 102 shown in block form in FIG. 1 and in FIG. 2.

In this illustrative example, nonlinear optical waveguide 802 comprises core region 804, upper cladding region 806, and lower cladding region 808. Lower cladding region 808 is formed on silicon substrate 810. As depicted, upper cladding region 806 and lower cladding region 808 are formed using an oxide ($SiO_2$).

As depicted, core region 804 comprises central region 812, first side region 814, and second side region 816. In this illustrative example, central region 812 is comprised of lithium niobate ($LiNbO_3$). First side region 814 and second side region 816 are comprised of silicon nitride ($Si_3N_4$).

As depicted, core region 804 has strip width 818 and strip height 819. In this example, central region 812 has center width 820. These two dimensions can be selected to obtain desired propagation of light through nonlinear optical waveguide 702. For example, at least one of strip width 818 or strip height 819 can be selected to obtain a desired phase matching condition. Center width 820 can be selected to increase an overlap of an electromagnetic field having a first sign for a light of interest within central region 812 while the electromagnetic signal has a second side in first side region 814 and second side region 816 such that light generation is increased in nonlinear optical waveguide 702.

In this illustrative example, optical waveguide structure 800 also includes electrode 822 and electrode 824. As depicted, electrode 822, electrode 724, and electrode 825 enable optical waveguide structure 800 to function as a phase shifter that can shift phases of the electromagnetic fields in light traveling through nonlinear optical waveguide 802. The fields can be, for example, transverse electric (TE) fields or transverse magnetic (TM) fields. In other illustrative examples, a single electrode can be used.

In FIG. 9, another illustration of a cross-sectional view of an optical waveguide structure with two core regions is depicted in accordance with an illustrative embodiment. Optical waveguide structure 900 is an example of an implementation for optical waveguide structure 100 in FIG. 1 and FIG. 2. Optical waveguide structure 900 can function as optical coupler and can be a wavelength selective coupler.

In this illustrative example, optical waveguide structure 900 comprises nonlinear optical waveguide 902 and nonlinear optical waveguide 904. Nonlinear optical waveguide 902 and nonlinear optical waveguide 904 are an example of an implementation for nonlinear optical waveguide 102 shown in block form in FIG. 1 and in FIG. 2.

As depicted, optical waveguide structure 900 comprises nonlinear optical waveguide 902 and nonlinear optical waveguide 904. In this illustrative example, nonlinear optical waveguide 902 and nonlinear optical waveguide 904 have upper cladding region 908 and lower cladding region 910. Lower cladding region 910 is formed on silicon substrate 912. Upper cladding region 908 and lower cladding region 910 are comprised of an oxide ($SiO_2$).

In this illustrative example, nonlinear optical waveguide structure 900 has first core region 914 and second core region 926 that are separated from each other by gap 906. This first core region 914 comprises central region 916, first side region 918, and second side region 920. As depicted, central region 916 is comprised of lithium niobate ($LiNbO_3$). First side region 918 and second side region 920 are comprised of silicon nitride ($Si_3N_4$).

As depicted, first core region 914 has strip width 922. Central region 916 has center width 924. These two dimensions can be selected to obtain desired propagation of light through nonlinear optical waveguide 902 and the coupling of light between first core region 914 and second core region 926.

As depicted, nonlinear optical waveguide 904 has second core region 926. In this example, second core region 926 comprises central region 928 and does not include side regions as compared to first core region 914 in nonlinear optical waveguide 902. Central region 928 is comprised of lithium niobate ($LiNbO_3$) in this depicted example.

Central region 928 has strip width 930. This width can be selected to adjust optical properties in the propagation of light through optical waveguide structure 900 and the coupling of light between the two core regions 914 and 926.

As depicted, first core region 914 has strip height 932 and second core region 926 has strip height 934. These heights can also be adjusted to obtain desired optical transmission properties. Adjusting the strip height and the strip width can change the effective refractive index for the pump light ($n_p$), signal light ($n_s$), and idler light ($n_i$). These changes can affect the coupling of light between the core regions. These changes can also affect the phase shift contributed by the optical coupler to the phase match. For separate waveguides, these changes also affect the wave-vector mismatch and the phase matching, which in turn affects the efficiency of the nonlinear optical generation process.

Turning to FIG. 10, yet another illustration of a cross-sectional view of an optical waveguide structure with two core regions is depicted in accordance with an illustrative embodiment. Optical waveguide structure 1000 is an example of an implementation for optical waveguide structure 100 in FIG. 1 and FIG. 2. Optical waveguide structure 1000 can function as an optical coupler.

In this illustrative example, optical waveguide structure 1000 comprises nonlinear optical waveguide 1002 and optical waveguide 1004. Nonlinear optical waveguide 1002 is an example of an implementation for nonlinear optical waveguide 102 shown in block form in FIG. 1 and in FIG. 2. Optical waveguide structure 1000 is similar to optical waveguide structure 900 in FIG. 9 except that optical waveguide 1004 is present in place of nonlinear optical waveguide 904 in FIG. 9.

In this illustrative example, nonlinear optical waveguide 1002 and optical waveguide 1004 have upper cladding region 1008 and lower cladding region 1010. Lower cladding region 1010 is formed on silicon substrate 1012. Upper cladding region 1008 and lower cladding region 1010 are comprised of an oxide ($SiO_2$).

As depicted, optical waveguide structure 1000 comprises first core region 1014 and second core region 1026 that are separated from each other by gap 1006. In this illustrative example, nonlinear optical waveguide 1002 has first core region 1014. This first core region comprises central region 1016, first side region 1018, and second side region 1020. As depicted, central region 1016 is comprised of lithium niobate ($LiNbO_3$). First side region 1018 and second side region 1020 are comprised of comprised of silicon nitride ($Si_3N_4$).

As depicted, first core region 1014 has strip width 1022. Central region 1016 has center width 1024. These two dimensions can be selected to obtain desired propagation of light through nonlinear optical waveguide 1002 and the coupling of light between first core region 1014 and second core region 1026.

As depicted, optical waveguide 1004 has second core region 1026. In this example, second core region 1026 comprises central region 1028. In this particular example, central region 1028 is not comprised of nonlinear optical material. As depicted, central region 1028 is comprised of silicon nitride ($Si_3N_4$).

Central region 1028 has strip width 1030. This width can be selected to adjust optical properties in the propagation of light through optical waveguide 1004 and the coupling of light between first core region 1014 and second core region 1026.

As depicted, first core region 1014 has strip height 1032 and second core region 1026 has strip height 1034. These heights can also be adjusted to obtain desired optical transmission properties.

Figure 11:
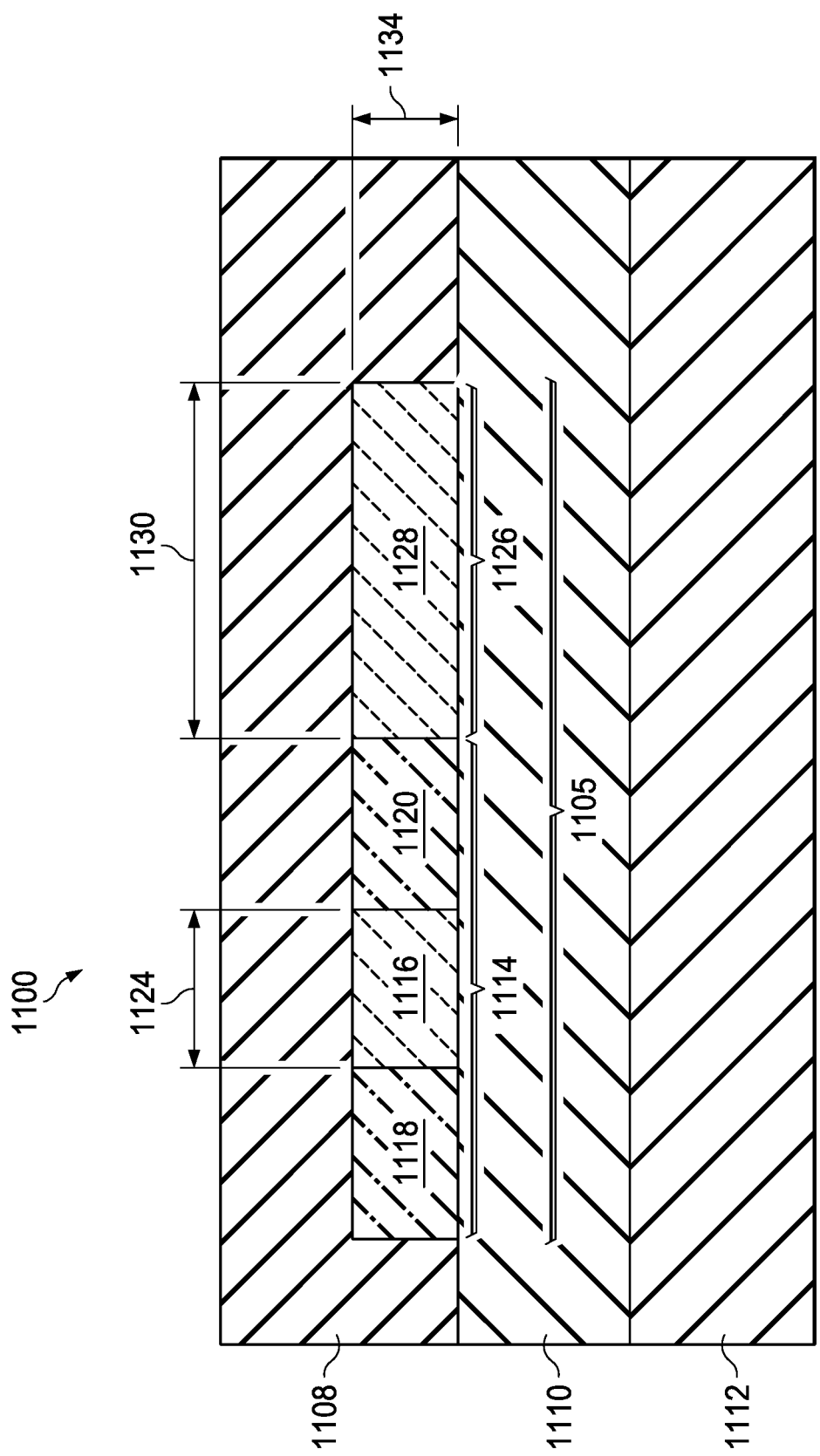
FIG. 11 is an illustration of a cross-sectional view of an optical waveguide structure with merged core regions that form a multimode interference coupler in accordance with an illustrative embodiment.

With reference to FIG. 11, another illustration of a cross-sectional view of an optical waveguide structure with merged core regions that form a multimode interference coupler is depicted in accordance with an illustrative embodiment. Optical waveguide structure 1100 is an example of optical waveguide device that can be used in optical waveguide structure 100 in FIG. 1 and FIG. 2. Optical waveguide structure 1100 can function as an optical coupler.

In this illustrative example, optical waveguide structure 1100 comprises a multimode interference coupler core 1105 that can be used in optical waveguide structure 100 shown in block form in FIG. 1 and FIG. 2 to couple nonlinear optical waveguide 102 to another optical waveguide that can be used in optical waveguide structure 100.

As depicted, nonlinear optical waveguide structure 1100 has upper cladding region 1108 and lower cladding region 1110. Lower cladding region 1110 is formed on silicon substrate 1112. Upper cladding region 1108 and lower cladding region 1110 are comprised of an oxide ($SiO_2$).

In this illustrative example, multimode interference coupler in optical waveguide 1100 has first core region 1114 that is an example of core region 200 in FIG. 2. This core region comprises central region 1116, first side region 1118, and second side region 1120. As depicted, central region 1116 is comprised of lithium niobate ($LiNbO_3$). First side region 1118 and second side region 1120 are comprised of silicon nitride ($Si_3N_4$). As depicted, central region 1116 in first core region 1114 has center width 1124.

As depicted, multimode interference coupler core 1105 in optical waveguide structure 1100 also has second core region 1126 with central region 1128. In this example, central region 1128 in second core region 1126 has width 1130 and is comprised of lithium niobate ($LiNbO_3$) in this depicted example. This width can be selected to adjust optical properties in the propagation of light through optical waveguide structure 1100.

As depicted, first core region 1114 and second core region 1128 has strip height 1134. This height can also be adjusted to obtain desired optical transmission properties.

Figure 12:
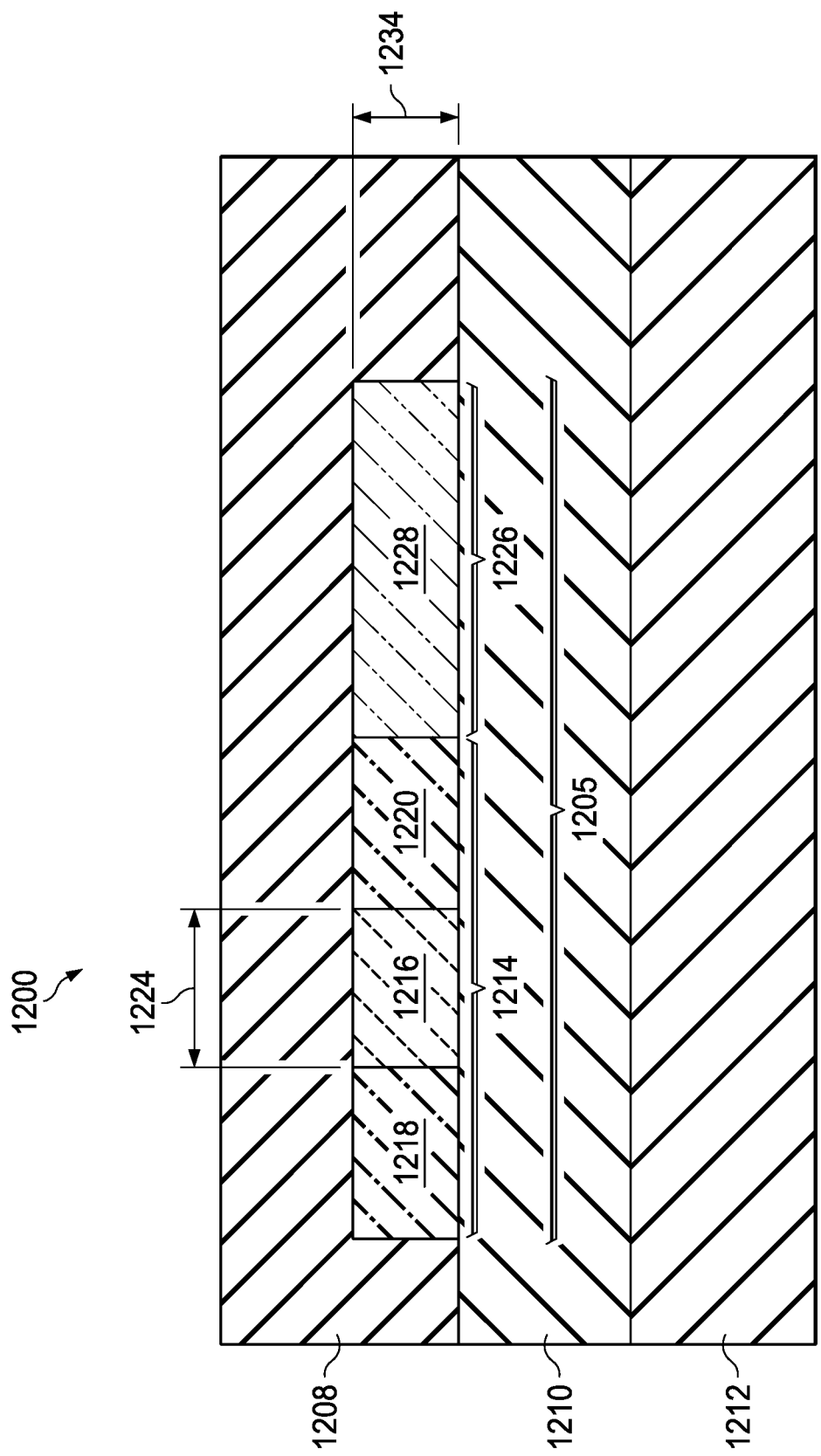
FIG. 12 is yet another illustration of a cross-sectional view of an optical waveguide structure with merged core regions that form a multimode interference coupler in accordance with an illustrative embodiment.

In FIG. 12, yet another illustration of a cross-sectional view of an optical waveguide structure with merged core regions that form a multimode interference coupler is depicted in accordance with an illustrative embodiment. Optical waveguide structure 1200 is an example of an optical waveguide component that can be used in optical waveguide structure 100 in FIG. 1 and FIG. 2. Optical waveguide structure 1200 can function as an optical coupler.

In this illustrative example, optical waveguide structure 1200 comprises nonlinear optical waveguide 1202 that is an example of an implementation for nonlinear optical waveguide 102 shown in block form in FIG. 1 and in FIG. 2. Optical waveguide structure 1200 is similar to optical waveguide structure 1100 in FIG. 11.

As depicted, nonlinear optical waveguide 1202 forms multimode interference coupler core 1205.

In this illustrative example, has upper cladding region 1208 and lower cladding region 1210. Lower cladding region 1210 is formed on silicon substrate 1212. Upper cladding region 1208 and lower cladding region 1210 are comprised of an oxide ($SiO_2$).

In this illustrative example, nonlinear optical waveguide 1202 has first core region 1214 that is an example of core region 200 in FIG. 2. This first core region comprises central region 1216, first side region 1218, and second side region 1220. As depicted, central region 1216 is comprised of lithium niobate ($LiNbO_3$). First side region 1218 and second side region 1220 are comprised of comprised of silicon nitride ($Si_3N_4$).

As depicted, central region 1216 in first core region 1214 has center width 1224. This width can be selected to obtain desired propagation of light through nonlinear optical waveguide 1202.

As depicted, multimode interference coupler core 1205 has second core region 1226. In this example, second core region 1226 is not comprised of nonlinear optical material. As depicted, second core region 1226 region 1228 is comprised of silicon nitride ($Si_3N_4$).

As depicted, first core region 1214 and second core region 1226 have strip height 1234. This height can be adjusted to obtain desired optical transmission properties.

Figure 13:
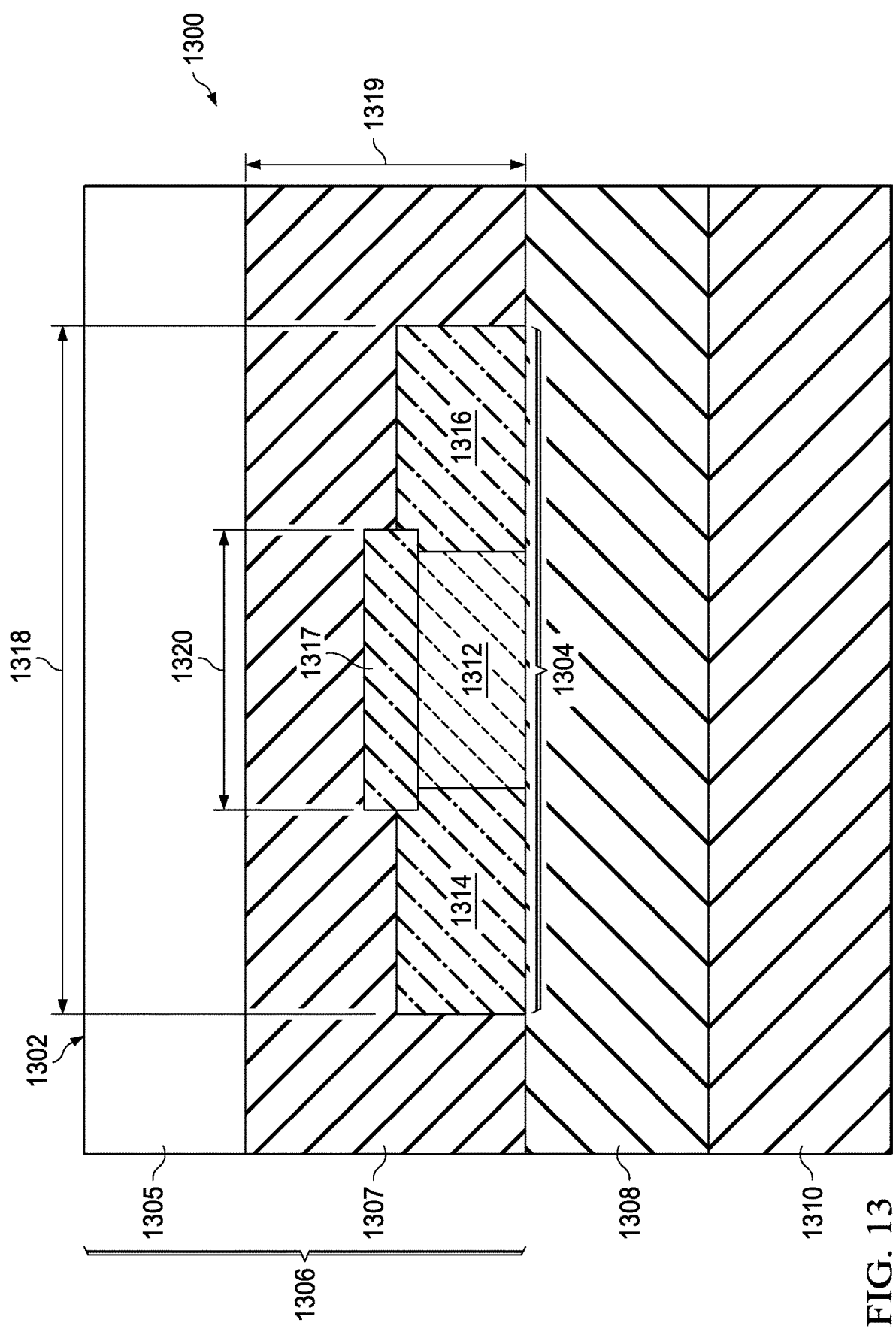
FIG. 13 is an illustration of a cross-sectional view of an optical waveguide structure in accordance with an illustrative embodiment.

Turning now to FIG. 13, an illustration of a cross-sectional view of an optical waveguide structure is depicted in accordance with an illustrative embodiment. Optical waveguide structure 1300 is an example of an implementation for optical waveguide structure 100 in FIG. 1 and FIG. 2.

In this illustrative example, optical waveguide structure 1300 comprises nonlinear optical waveguide 1302. Nonlinear optical waveguide 1302 is an example of an implementation for nonlinear optical waveguide 102 shown in block form in FIG. 1 and in FIG. 2.

In this illustrative example, nonlinear optical waveguide 1302 comprises core region 1304, upper cladding region 1306, and lower cladding region 1308. Lower cladding region 1308 is formed on a silicon substrate 1310. As depicted, upper cladding region 1306 is a two-part cladding region comprises air 1305 and silicon oxide 1307. As depicted, lower cladding region 1308 that is comprised of silicon oxide.

As depicted, core region 1304 comprises central region 1312, first side region 1314, second side region 1316, and top region 1317. In this illustrative example, central region 1312 is comprised of lithium niobate ($LiNbO_3$). First side region 1314, second side region 1316, and top region 1317 are comprised of silicon nitride ($Si_3N_4$).

As depicted, first side region 1314, second side region 1316 are on either side of central region 1312, and top region 1317 is located over central region 1312. Although first side region 1314, second side region 1316, and top region 1317 are described as separate elements, these elements can be a single structure formed at the same time during fabrication of nonlinear optical waveguide 1302.

In this illustrative example, top region 1317 affects the electric field distributions for the pump light, signal light, and idler light. This top region can also affect the values for the effective refractive indices $n_p$, $n_s$ and $n_i$ of the pump light, signal light, and idler light. Top region 1317, when present in a phase shifter, can improve the efficiency of the phase shifter.

As depicted, core region 1304 has strip width 1318, and central region 1312 has center width 1320. These two dimensions can be selected to obtain a desired propagation of light through nonlinear optical waveguide 1302.

As depicted, upper cladding 1306 has height 1319. Height 1319 is measured based on the height of silicon oxide 1307 in upper cladding region 1306.

The illustrations of the different cross-sections in FIGS. 3 and 7-13 are provided as a non-limiting examples of implementations for optical waveguide structure 100 in FIG. 1 and FIG. 2. These illustrations provide illustrative examples of how different cross-sections can be implemented and are not meant to be limiting as to how other illustrative examples can be included.

For example, in other implementations, the sides of central region 304, first side region 310 and second side region 312 in core region 302 of nonlinear optical waveguide 300 in FIG. 3, can have sides that are perpendicular to lower cladding region 306 instead of angled sides as depicted in FIG. 3. Examples of perpendicular sides are shown in FIGS. 7-13. The angled sides are not meant to limit the other examples to particular angles. In yet similar illustrative examples, the central region can have perpendicular sides while the side regions have angled sides. In yet other depicted examples, the central region can have a perpendicular side while the side regions have angled sides.

As yet another example, other types of tuning elements may be used in addition to or in place of tuning electrodes that apply a voltage in FIG. 7. For example, a tuning element can cause phase shifting of optical signals traveling through an optical waveguide using an activation such as a thermal energy, a strain, or some other type of energy that can be applied to the optical waveguide to affect the manner in which light propagates through the optical waveguide.

Figure 14:
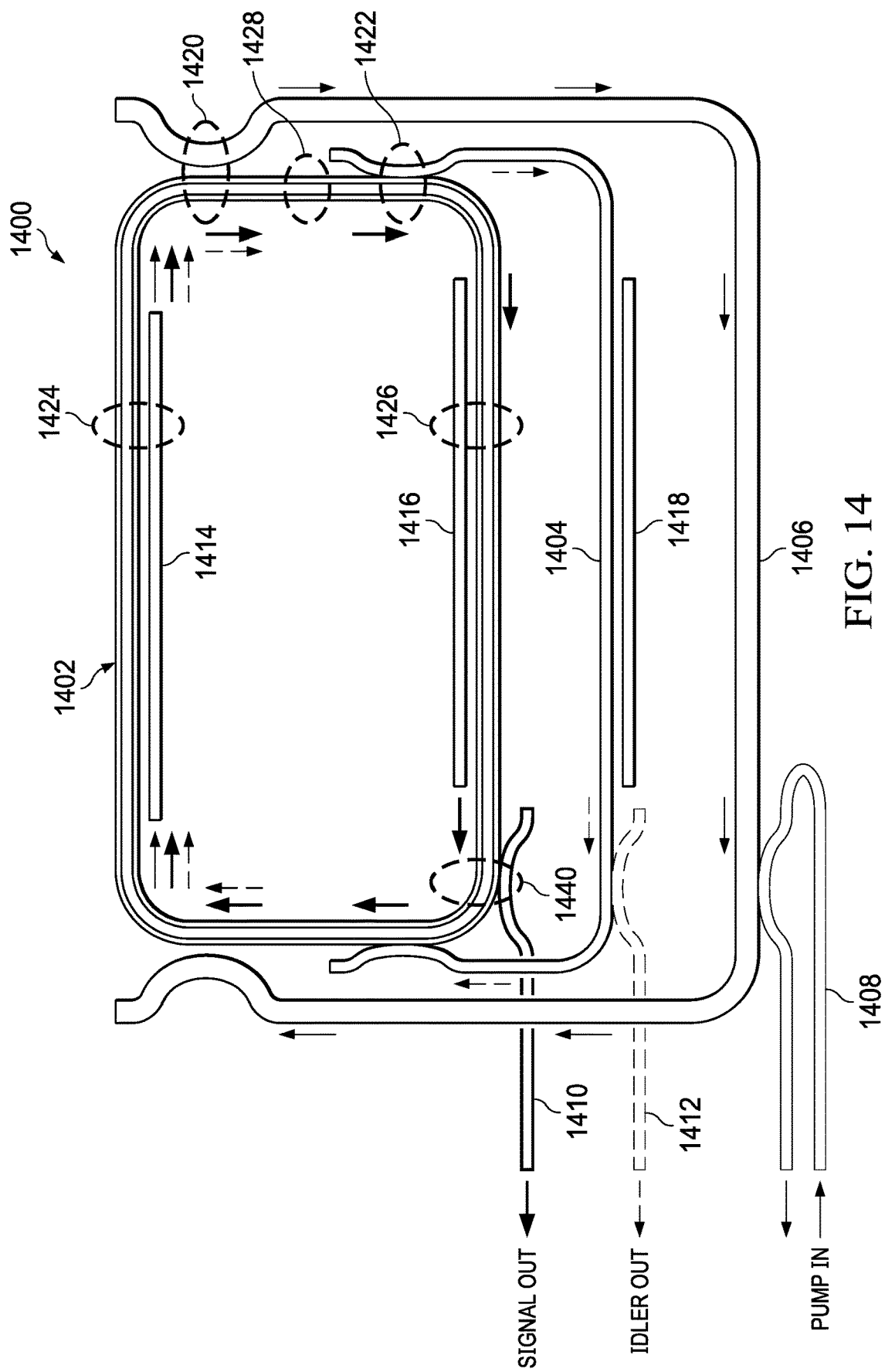
FIG. 14 is an illustration of an optical waveguide structure in accordance with an illustrative embodiment.

With reference now to FIG. 14, an illustration of an optical waveguide structure is depicted in accordance with an illustrative embodiment. As depicted, optical waveguide structure 1400 comprises main nonlinear optical waveguide 1402, first extension optical waveguide 1404, and second extension optical waveguide 1406. In this illustrative example, main nonlinear optical waveguide 1402 and first extension optical waveguide 1404 are comprised of nonlinear material.

As depicted, first extension optical waveguide 1404 can be an idler loop extension optical waveguide, and second extension optical waveguide 1406 can be a pump loop extension waveguide. Additionally, area 1440 can be an ending first extension wavelength selective coupler located in an ending first extension location in main nonlinear optical waveguide 1402 and first extension optical waveguide 1404.

In this illustrative example, light can propagate through these optical waveguides. For example, light comprising a pump light, a signal light, and an idler light can propagate through one or more of main nonlinear optical waveguide 1402, first extension optical waveguide 1404, and second extension optical waveguide 1406. In this illustrative example, optical waveguide structure 1400 incorporates one or more nonlinear optical processes that generate at least one of a signal light or an idler light using a pump light input into optical waveguide structure 1400 through pump input waveguide 1408.

As depicted, optical waveguide structure 1400 also comprises signal output waveguide 1410 and idler output waveguide 1412. In this illustrative example, pump input waveguide 1408 operates to input a pump light into second extension optical waveguide 1406 in optical waveguide structure 1400. Signal output waveguide 1410 operates to output a signal light from main nonlinear optical waveguide 1402. Idler output waveguide 1412 operates to output light from first extension optical waveguide 1404.

Additionally, optical waveguide structure 1400 also includes electrode 1414, electrode 1416, and electrode 1418. As depicted, electrode 1414 and electrode 1416 are adjacent to portions of main nonlinear optical waveguide 1402. These electrodes can operate to shift the phases of one of optical signals propagating through main nonlinear optical waveguide 1402. These optical signals can be, for example, selected from at least one of a pump light, a signal light, or an idler light.

In this illustrative example, electrode 1418 is located adjacent to a portion of first extension optical waveguide 1404. This electrode operates to shift the phase of an idler light propagate through first extension optical waveguide 1404.

Optical waveguide structure 1400 can be implemented using one or more of optical waveguide structures such as the optical waveguide structures depicted in cross-sectional form in FIG. 3 and FIGS. 7-13. For example, area 1420 containing main nonlinear optical waveguide 1402 and second extension optical waveguide 1406 can have a cross-sectional structure as shown for optical waveguide structure 1000 in FIG. 10 or for optical waveguide structure 1200 in FIG. 12. As another example, area 1422 contains main nonlinear optical waveguide 1402 and first extension optical waveguide 1404. This area can have a cross-sectional structure as shown for optical waveguide structure 900 in FIG. 9 or for optical waveguide structure 1100 in FIG. 11.

As depicted, area 1422 can be for a first extension wavelength selective coupler located at a first extension starting location in main nonlinear optical waveguide 1402 and the first extension optical waveguide 1404.

In this depicted example, area 1424 includes main nonlinear optical waveguide 1402 and electrode 1414. Additionally, area 1426 includes main nonlinear optical waveguide 1402 and electrode 1416. These two areas can have a cross-sectional structure as shown for optical waveguide structure 700 in FIG. 7 in which a single tuning electrode is present. As yet another example, area 1428 includes main nonlinear optical waveguide 1402. Area 1428 can have a cross-sectional structure as shown for nonlinear optical waveguide 300 in FIG. 3.

As depicted, area 1440 is an optical coupler for coupling a signal light from main nonlinear optical waveguide 1402 to signal output waveguide 1410. This area can have a cross-sectional structure as shown for optical waveguide structure 1000 in FIG. 10.

In this example, light of different wavelengths can travel in different loops having different lengths within optical waveguide structure 1400. For example, first light of a first wavelength can travel within a first loop within main nonlinear optical waveguide 1402. The first light can be a signal light in this example. A second light of the second wavelength can travel in a second loop within main nonlinear optical waveguide 1402 and first extension optical waveguide 1404 in which the second loop has a second length for the second light of the second wavelength. In this example, the second light can be an idler light. A third light of a third wavelength travels in a third loop within main nonlinear optical waveguide 1402 and second extension optical waveguide 1406 in which the third loop has a third length for the third light of the third wavelength. In this example, the third light can be a pump light.

Figure 15:
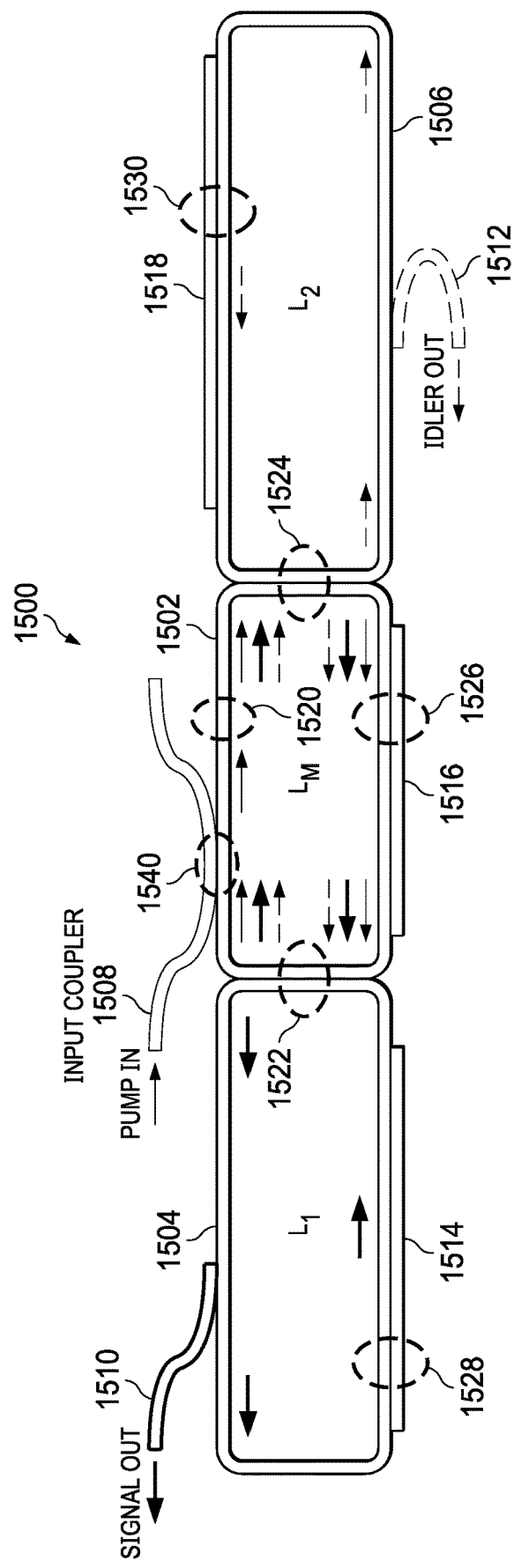
FIG. 15 is an illustration of an optical waveguide structure in accordance with an illustrative embodiment.

With reference to FIG. 15, an illustration of an optical waveguide structure is depicted in accordance with an illustrative embodiment. As depicted, optical waveguide structure 1500 comprises main nonlinear optical waveguide 1502, signal loop extension optical waveguide 1504, and idler loop extension optical waveguide 1506. In this illustrative example, main nonlinear optical waveguide 1502, signal loop extension optical waveguide 1504 and idler loop extension optical waveguide 1506 are comprised of nonlinear material.

Light can propagate through the optical waveguides in optical waveguide structure 1500. For example, light comprising a pump light, a signal light, and an idler light can propagate through one or more of main nonlinear optical waveguide 1502, signal loop extension optical waveguide 1504, and idler loop extension optical waveguide 1506. In this illustrative example, optical waveguide structure 1500 incorporates one or more nonlinear optical processes that generate at least one of a signal light or an idler light using a pump light input into optical waveguide structure 1500 through pump input waveguide 1508.

In this illustrative example, optical waveguide structure 1500 also has signal output waveguide 1510 and idler output waveguide 1512. Pump input waveguide 1508 operates to input a pump light into main nonlinear optical waveguide 1502. As depicted, signal output waveguide 1510 operates to output a signal light from signal loop extension optical waveguide 1504, and idler output waveguide 1512 operates to output an idler light from idler loop extension optical waveguide 1506.

In this illustrative example, optical waveguide structure 1500 also includes electrode 1514, electrode 1516, and electrode 1518. These electrodes can operate to apply control signals in the form of voltages or currents to adjust the phases of one or more of the different wavelengths of light traveling through optical waveguide structure 1500.

Optical waveguide structure 1500 can be implemented using one or more of the optical waveguide structures such as the optical waveguide structures depicted in cross-sectional form in FIG. 3 and FIGS. 7-13. For example, area 1520 includes main nonlinear optical waveguide 1502. In this example, area 1520 can have a cross-sectional structure as shown for nonlinear optical waveguide 300 in FIG. 3.

As another example, area 1522 contains main nonlinear optical waveguide 1502 and signal loop extension optical waveguide 1504. This area can have a cross-sectional structure as shown for optical waveguide structure 900 in FIG. 9 or for optical waveguide structure 1100 in FIG. 11 and can form a first wavelength selected coupler. Area 1524 contains main nonlinear optical waveguide 1502 and idler loop extension optical waveguide 1506. As illustrated, area 1524 can also have a cross-sectional structure as shown for optical waveguide structure 900 in FIG. 9 or for optical waveguide structure 1100 in FIG. 11 and can form a second wavelength selected coupler.

In this depicted example, area 1526 includes main nonlinear optical waveguide 1502 and electrode 1516. This area can have a cross-sectional structure as shown for optical waveguide structure 700 in FIG. 7 using a single tuning electrode.

As depicted, area 1540 is an optical coupler for coupling a signal light from main nonlinear optical waveguide 1502 to pump input waveguide 1508. This area can have a cross-sectional structure as shown for optical waveguide structure 1000 in FIG. 10.

Figure 16:
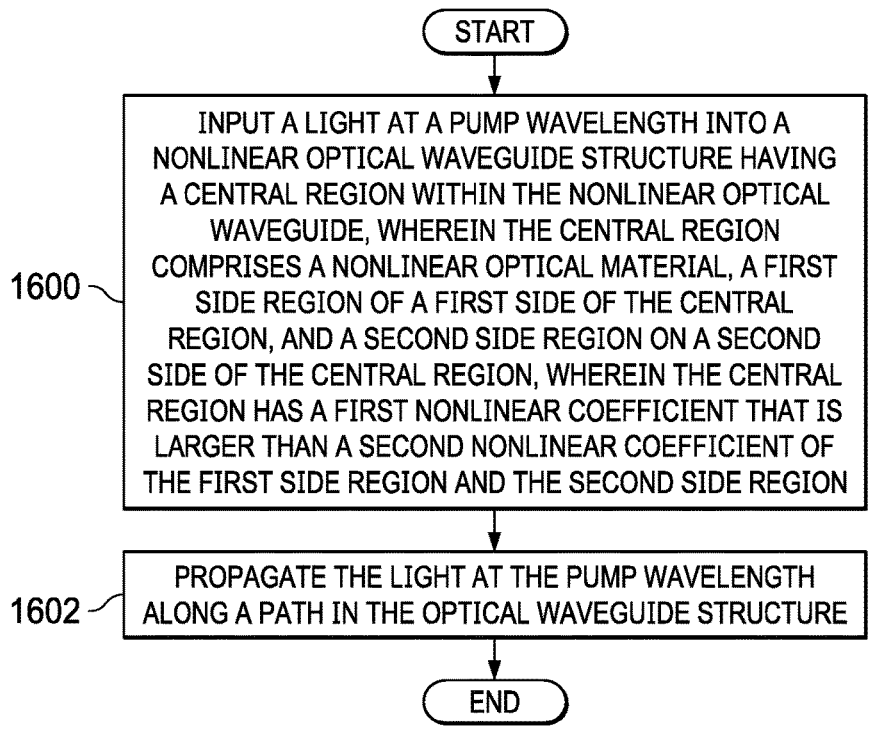
FIG. 16 is an illustration of a flowchart of a process for moving light through an optical waveguide structure in accordance with an illustrative embodiment.

With reference now to FIG. 16, an illustration of a flowchart of a process for moving light through an optical waveguide structure is depicted in accordance with an illustrative embodiment. The process in FIG. 16 can be implemented in a physical waveguide structure such as nonlinear optical waveguide 102 in FIGS. 1 and 2. This process can also be implemented using the different optical waveguides shown in FIG. 3 and FIGS. 7-13 in the different physical implementation shown in the different illustrative examples.

The process begins by inputting a light at a pump wavelength into a nonlinear optical waveguide structure having a central region within the nonlinear optical waveguide, wherein the central region comprises a nonlinear optical material, a first side region on a first side of the central region, and a second side region on a second side of the central region, wherein the central region has a first nonlinear coefficient that is larger than a second nonlinear coefficient of the first side region and the second side region (operation 1600).

The process propagates the light at the pump wavelength along a path in the optical waveguide structure (operation 1602). The process terminates thereafter. In operation 1602, light generation occurs in the nonlinear optical waveguide.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented hardware, or a combination of the program code and hardware. When implemented in hardware, the hardware can, for example, take the form of integrated circuits that are manufactured or configured to perform one or more operations in the flowcharts or block diagrams. When implemented in software, the software can be used to simulate optical waveguide structures. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 17:
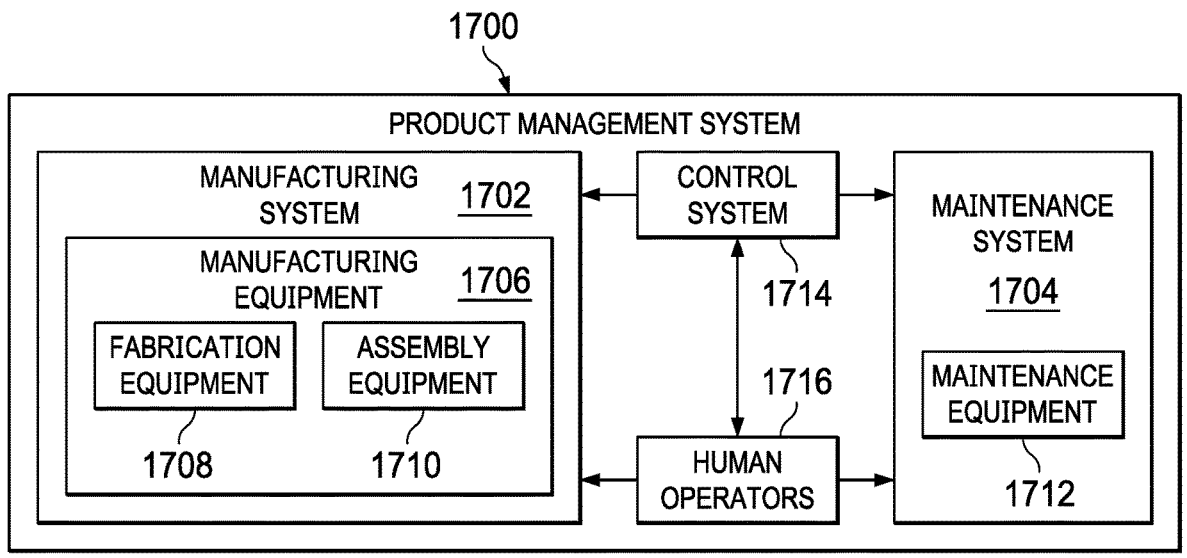
FIG. 17 is an illustration of a block diagram of a product management system in accordance with an illustrative embodiment.

Turning now to FIG. 17, an illustration of a block diagram of a product management system is depicted in accordance with an illustrative embodiment. Product management system 1700 is a physical hardware system. In this illustrative example, product management system 1700 includes at least one of manufacturing system 1702 or maintenance system 1704.

Manufacturing system 1702 is configured to manufacture products. As depicted, manufacturing system 1702 includes manufacturing equipment 1706. Manufacturing equipment 1706 includes at least one of fabrication equipment 1708 or assembly equipment 1710.

Fabrication equipment 1708 is equipment that used to fabricate the nonlinear optical waveguide structure. Multiple copies or multiple versions of nonlinear optical waveguide structures can be fabricated on a substrate wafer. For example, different structures in nonlinear optical waveguides can be fabricated on the same substrate wafer. The substrate wafer can comprise a material such as silicon or lithium niobate or quartz or sapphire or silicon carbide.

Fabrication equipment 1708 can be used to fabricate a number of different structures. For example, fabrication equipment 1708 can be used to fabricate at least one of optical waveguide structures, nonlinear optical waveguides, laser transmitters, ultraviolet transmission systems, point-to-point communication devices, laser infrared countermeasure sources, through water optical communication devices, or other suitable devices, antennas, or other suitable types of parts or devices.

Fabrication equipment 1708 can include machines and tools. With respect to fabricating semiconductor components and optical waveguide components, fabrication equipment 1708 can comprise at least one of an epitaxial reactor, an oxidation system, a diffusion system, an etching system, a cleaning system, a bonding machine, a dicing machine, a wafer saw, an ion implantation system, a physical vapor deposition system, a chemical vapor deposition system, a photolithography system, an electron-beam lithography system, a plasma etcher, a die attachment machine, a wire bonder, a die overcoat system, molding equipment, a hermetic sealer, an electrical tester, a burn-in oven, a retention bake oven, a UV erase system, or other suitable types of equipment that can be used to manufacture semiconductor structures.

Assembly equipment 1710 is equipment used to assemble parts to form a product such as a chip, an integrated circuit, a sensor, an optical transmitter, an optical receiver, a computer, an aircraft, or some other product. Assembly equipment 1710 also can include machines and tools. These machines and tools may be at least one of a robotic arm, a spinner system, a sprayer system, an elevator system, a rail-based system, or a robot.

In this illustrative example, maintenance system 1704 includes maintenance equipment 1712. Maintenance equipment 1712 can include any equipment needed to perform maintenance on and evaluation of a product. Maintenance equipment 1712 may include tools for performing different operations on parts on a product. These operations can include at least one of disassembling parts, refurbishing parts, inspecting parts, reworking parts, manufacturing replacement parts, or other operations for performing maintenance on the product. These operations can be for routine maintenance, inspections, upgrades, refurbishment, or other types of maintenance operations.

In the illustrative example, maintenance equipment 1712 may include optical inspection devices, x-ray imaging systems, surface-profile measurement systems, drills, vacuum leak checkers, and other suitable devices. In some cases, maintenance equipment 1712 can include fabrication equipment 1708, assembly equipment 1710, or both to produce and assemble parts that needed for maintenance.

Product management system 1700 also includes control system 1714. Control system 1714 is a hardware system and may also include software or other types of components. Control system 1714 is configured to control the operation of at least one of manufacturing system 1702 or maintenance system 1704. In particular, control system 1714 can control the operation of at least one of fabrication equipment 1708, assembly equipment 1710, or maintenance equipment 1712.

The hardware in control system 1714 can be implemented using hardware that may include computers, circuits, networks, and other types of equipment. The control may take the form of direct control of manufacturing equipment 1706. For example, robots, computer-controlled machines, and other equipment can be controlled by control system 1714. In other illustrative examples, control system 1714 can manage operations performed by human operators 1716 in manufacturing or performing maintenance on a product. For example, control system 1714 can assign tasks, provide instructions, display models, or perform other operations to manage operations performed by human operators 1716. In these illustrative examples, the different processes for fabricating semiconductor structures, optical structures, nonlinear optical waveguides, laser transmitters, photon generators, photon transmitters, photon detectors, ultraviolet transmission systems, point-to-point communication devices, laser infrared countermeasure sources, through water optical communication devices, or other suitable devices can be manufactured using processes implemented in control system 1714.

In the different illustrative examples, human operators 1716 can operate or interact with at least one of manufacturing equipment 1706, maintenance equipment 1712, or control system 1714. This interaction can occur to manufacture semiconductor structures and other components for products such as semiconductor devices, optical waveguides, or other components for use in products such as aircraft, spacecraft, communications systems, computation systems, and sensor systems.

Further, control system 1714 can be used to adjust manufacturing of nonlinear optical waveguides, optical waveguides, optical couplers and terminations dynamically during the manufacturing process. For example, many points in the process of fabricating the optical waveguide structure including the nonlinear optical waveguide as well as other components are present at which adjustments can be made to control characteristics of components in an optical waveguide structure.

The dimensions of the fabricated core region can be measured, and optical waveguide design simulations can be performed to determine the values of the effective refractive indices that can be obtained for various candidate values of the upper cladding height. The upper cladding height that gives the desired value for the phase walk-off can be chosen accordingly. Upper cladding material can then be deposited that has the desired thickness or height.

Another point in the fabrication process is after the upper cladding material has been deposited to a value that is greater than what might be desired. Test devices such as asymmetric Mach-Zehnder interferometers and micro-ring resonators can be fabricated in addition to the nonlinear optical waveguide.

These test devices can be characterized to extract values for the effect refractive indices for the upper cladding height of those test devices. The upper cladding height can then be reduced by etching away some of the upper cladding material, possibly in an iterative manner accompanied by additional measurements of the test structures. In this way, the desired value for the upper cladding height can be approached and then achieved.

Thus, the illustrative embodiments provide a method, apparatus, and system for propagating light in an optical waveguide structure. In one illustrative example, an optical waveguide structure comprises a nonlinear optical waveguide, a central region, a first side region, and a second side region. The central region is located within the nonlinear optical waveguide, wherein the central region comprises a nonlinear optical material. The first side region is on a first side of the central region and the second side region is on a second side of the central region. The central region has a first nonlinear coefficient that is larger than a second nonlinear coefficient of the first side region and the second side region.

The configuration of the core region containing the central region and the two side regions can be made in a manner that increases the generation of light by the optical waveguide structure. The different dimensions can be selected to increase the efficiency and light generation in the different illustrative examples.

Thus, illustrative embodiments provide a method, apparatus, system for a cross-section in an optical waveguide has desired characteristics in at least one of light propagation or light generation. In one illustrative example, an optical waveguide structure comprises a nonlinear optical waveguide with a central region, a first side region, and a second side region located within the nonlinear optical waveguide. The central region comprises a nonlinear optical material. The first side region is located on a first side of the central region. The second side region is located on a second side of the central region. The central region has a first nonlinear coefficient that is larger than a second nonlinear coefficient of the first side region and the second side region. The central region, the first side region, and the second side region form a core region within the nonlinear optical waveguide.

In one illustrative example, the different structures in the core region can be designed in a manner that provides at least one of the design propagation or light generation within the nonlinear optical waveguide. The design can include a selection of at least one of a material or a dimension for the different components in the core region. As another example, the dimensions the core region as a whole can be selected. In yet another illustrative example, other structures can be included in the nonlinear optical waveguide such as a cladding, another core region, or other suitable components.

Some features of the illustrative examples are described in the following clauses. These clauses are examples of features not intended to limit other illustrative examples.

Clause 1:

An optical waveguide structure comprising:

a nonlinear optical waveguide;

a central region within the nonlinear optical waveguide, wherein the central region comprises a nonlinear optical material having a first nonlinear coefficient;

a first side region on a first side of the central region; and a second side region on a second side of the central region, wherein the nonlinear optical material comprising the central region has the first nonlinear coefficient that is larger than a second nonlinear coefficient of a second material comprising the first side region and the second side region.

Clause 2:

The optical waveguide structure according to clause 1, wherein the central region has a set of dimensions selected to increase a light generation within the optical waveguide structure.

Clause 3:

The optical waveguide structure according to clause 2, wherein the light generation increases for at least one of a signal light or an idler light when a pump light travels through the nonlinear optical waveguide.

Clause 4:

The optical waveguide structure according to one of clause 2 or 3, wherein the set of dimensions is a width selected to increase an overlap of an electromagnetic field for a light of interest with the central region and the electromagnetic field for the light of interest has a second sign in the first side region and the second side region such that light generation is increased in the nonlinear optical waveguide.

Clause 5:

The optical waveguide structure according to one of clause 2, 3, or 4, wherein the set of dimensions is selected from least one of a width, a height, or a sidewall slope.

Clause 6:

The optical waveguide structure according to one of clause 1, 2, 3, 4, or 5, wherein the second nonlinear coefficient is selected such that the first side region and the second side region have a reduced contribution to light generation.

Clause 7:

The optical waveguide structure according to one of clause 1, 2, 3, 4, 5, or 6, wherein the second nonlinear coefficient is selected such that a nonlinear optical interaction in the nonlinear optical waveguide is reduced to about zero.

Clause 8:

The optical waveguide structure according to one of clause 1, 2, 3, 4, 5, 6, or 7, wherein a pump light traveling in the optical waveguide structure has an electromagnetic field that has a first sign in the central region while having a second sign in the first side region and the second side region.

Clause 9:

The optical waveguide structure according to one of clause 1, 2, 3, 4, 5, 6, 7, or 8, wherein a cross-section of the central region, the first side region, and the second side region has at least one of a strip width or a strip height that is selected to cause a phase matching condition.

Clause 10:

The optical waveguide structure according to one of clause 1, 2, 3, 4, 5, 6, 7, 8, or 9, wherein the central region, the first side region and the second side region form a core region, the optical waveguide structure further comprising:

a cladding region comprising a dielectric material, wherein the core region is located within the cladding region.

Clause 11:

The optical waveguide structure according to clause 10, wherein the dielectric material is selected from at least one of a silicon dioxide, a polymer, or air.

Clause 12:

The optical waveguide structure according to one of clause 1, 2, 3, 4, 5, 6, 7, 8, 9, 10, or 11, wherein the nonlinear optical material is a first nonlinear optical material that has a first second order nonlinear coefficient with a magnitude that is at least one picometer/volt, and wherein the first side region and the second side region have a second nonlinear optical material that has a second second-order nonlinear coefficient whose magnitude is equal to or less than one third the magnitude of the first second order nonlinear coefficient for the first nonlinear optical material.

Clause 13:

The optical waveguide structure according to one of clause 1, 2, 3, 4, 5, 6, 7, 8, 9, 10, 11, or 12, wherein the central region is comprised of at least one of lithium niobate ($LiNbO_2$), silicon carbide, aluminum nitride, gallium nitride, gallium aluminum nitride, gallium phosphide, gallium aluminum phosphide, aluminum phosphide, gallium arsenide, gallium aluminum arsenide, or aluminum arsenide.

Clause 14:

The optical waveguide structure according to one of clause 1, 2, 3, 4, 5, 6, 7, 8, 9, 10, 11, 12, or 13, wherein the second material in the first side region and the second side region are comprised of a material such that a nonlinear optical process in the first side region and the second side region does not generate light.

Clause 15:

The optical waveguide structure according to one of clause 1, 2, 3, 4, 5, 6, 7, 8, 9, 10, 11, 12, 13, or 14, wherein the first side region and the second side region are comprised of at least one of silicon nitride, titanium dioxide silicon, silicon oxynitride, or hafnia.

Clause 16:

The optical waveguide structure according to one of clause 1, 2, 3, 4, 5, 6, 7, 8, 9, 10, 11, 12, 13, 14, or 15, wherein the nonlinear optical waveguide is a main nonlinear optical waveguide, the optical waveguide structure further comprising:

a first extension optical waveguide;

a second extension optical waveguide;

a first wavelength selective coupler that couples the main nonlinear optical waveguide and the first extension optical waveguide to each other such that a second light of a second wavelength is coupled between the main nonlinear optical waveguide and the first extension optical waveguide; and a second wavelength selective coupler that couples the main nonlinear optical waveguide and the second extension optical waveguide to each other such a third light of a third wavelength is coupled between the main nonlinear optical waveguide and the second extension optical waveguide.

Clause 17:

The optical waveguide structure according to clause 16, wherein the second light of the second wavelength travels in a second loop within the main nonlinear optical waveguide and the first extension optical waveguide in which the second loop has a second length for the second light of the second wavelength, and wherein the third light of the third wavelength travels in a third loop within the main nonlinear optical waveguide and the second extension optical waveguide in which the third loop has a third length for the third light of the third wavelength.

Clause 18:

The optical waveguide structure according to clause 16, wherein the first wavelength selective coupler is a starting first extension wavelength selective coupler located at a first extension starting location in the main nonlinear optical waveguide and the first extension optical waveguide and the second wavelength selective coupler is a starting second extension wavelength selective coupler located at a second extension starting location in the main nonlinear optical waveguide and the second extension optical waveguide, the optical waveguide structure further comprising:
- an ending first extension wavelength selective coupler located in an ending first extension location in the main nonlinear optical waveguide and the first extension optical waveguide; and
- an ending second extension wavelength selective coupler located at an ending second extension location in the main nonlinear optical waveguide and the second extension optical waveguide.

Clause 19:

The optical waveguide structure according to one of clause 1, 2, 3, 4, 5, 6, 7, 8, 9, 10, 11, 12, 13, 14, 15, 16, 17, or 18 further comprising:
- a set of electrodes in a location selected from at least one of adjacent to the first side region, adjacent to the second side region, adjacent to the central region.

Clause 20:

The optical waveguide structure according to one of clause 1, 2, 3, 4, 5, 6, 7, 8, 9, 10, 11, 12, 13, 14, 15, 16, 17, 18, or 19, wherein the central region, the first side region and the second side region form a first core region and further comprising:
- a second core region.

Clause 21:

The optical waveguide structure according to clause 20, wherein a gap is present between the first core region and the second core region.

Clause 22:

A method for moving a light through a nonlinear optical waveguide structure:
- inputting a light at a pump wavelength into the nonlinear optical waveguide structure having a central region within a nonlinear optical waveguide in nonlinear optical waveguide structure, wherein the central region comprises a nonlinear optical material, a first side region of a first side of the central region, and a second side region on a second side of the central region, wherein the central region has a first nonlinear coefficient that is larger than a second nonlinear coefficient of the first side region and the second side region; and
- propagating the light at the pump wavelength along a path in the optical waveguide structure, wherein light generation occurs in the nonlinear optical waveguide.

Clause 23:

The method of according to clause 22, wherein the central region has a set of dimensions selected to increase a light generation in the optical waveguide structure.

Clause 24:

The method according to clause 23, wherein the light generation increases for at least one of a signal light or an idler light when a pump light overlaps the central region of the nonlinear optical waveguide.

Clause 25:

The method according to clause 23, wherein the set of dimensions is a width selected to increase an overlap of an electromagnetic field has a first sign for a light of interest with the central region and the electromagnetic field for the light of interest has a second sign in the first side region and the second side region such that light generation is increased within the nonlinear optical waveguide.

Clause 26:

The method according to one of clause 23, 24, or 25, wherein the set of dimensions is selected from least one of a width or a height.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An optical waveguide structure comprising:
   a nonlinear optical waveguide;
   a central region within the nonlinear optical waveguide, wherein the central region comprises a nonlinear optical material having a first nonlinear coefficient;
   a first side region laterally adjacent to a first side of the central region and longitudinally parallel to the central region along the direction of propagation; and
   a second side region laterally adjacent to a second side of the central region and longitudinally parallel to the central region along the direction of propagation, wherein the nonlinear optical material comprising the central region has the first nonlinear coefficient that is larger than a second nonlinear coefficient of a second material comprising the first side region and the second side region.

2. The optical waveguide structure of claim 1, wherein the central region has a set of dimensions selected to increase a light generation within the optical waveguide structure.

3. The optical waveguide structure of claim 2, wherein the light generation increases for at least one of a signal light or an idler light when a pump light travels through the nonlinear optical waveguide.

4. The optical waveguide structure of claim 2, wherein the set of dimensions is a width selected to increase an overlap of an electromagnetic field for a light of interest with the central region and the electromagnetic field for the light of interest has a second sign in the first side region and the second side region such that light generation is increased in the nonlinear optical waveguide.

5. The optical waveguide structure of claim 2, wherein the set of dimensions is selected from least one of a width, a height, or a sidewall slope.

6. The optical waveguide structure of claim 1, wherein the second nonlinear coefficient is selected such that the first side region and the second side region have a reduced contribution to light generation.

7. The optical waveguide structure of claim 1, wherein the second nonlinear coefficient is selected such that a nonlinear optical interaction in the nonlinear optical waveguide is reduced to about zero.

8. The optical waveguide structure of claim 1, wherein a pump light traveling in the optical waveguide structure has an electromagnetic field that has a first sign in the central region while having a second sign in the first side region and the second side region.

9. The optical waveguide structure of claim 1, wherein a cross-section of the central region, the first side region, and the second side region has at least one of a strip width or a strip height that is selected to cause a phase matching condition.

10. The optical waveguide structure of claim 1, wherein the central region, the first side region and the second side region form a core region, the optical waveguide structure further comprising:
a cladding region comprising a dielectric material, wherein the core region is located within the cladding region.

11. The optical waveguide structure of claim 10, wherein the dielectric material is selected from at least one of a silicon dioxide, a polymer, or air.

12. The optical waveguide structure of claim 1, wherein the nonlinear optical material is a first nonlinear optical material that has a first second order nonlinear coefficient with a magnitude that is at least one picometer/volt, and wherein the first side region and the second side region have a second nonlinear optical material that has a second second-order nonlinear coefficient whose magnitude is equal to or less than one third the magnitude of the first second order nonlinear coefficient for the first nonlinear optical material.

13. The optical waveguide structure of claim 1, wherein the central region is comprised of at least one of lithium niobate ($LiNbO_2$), silicon carbide, aluminum nitride, gallium nitride, gallium aluminum nitride, gallium phosphide, gallium aluminum phosphide, aluminum phosphide, gallium arsenide, gallium aluminum arsenide, or aluminum arsenide.

14. The optical waveguide structure of claim 1, wherein the second material in the first side region and the second side region are comprised of a material such that a nonlinear optical process in the first side region and the second side region does not generate light.

15. The optical waveguide structure of claim 1, wherein the first side region and the second side region are comprised of at least one of silicon nitride, titanium dioxide silicon, silicon oxynitride, or hafnia.

16. The optical waveguide structure of claim 1, wherein the nonlinear optical waveguide is a main nonlinear optical waveguide, the optical waveguide structure further comprising:
a first extension optical waveguide;
a second extension optical waveguide;
a first wavelength selective coupler that couples the main nonlinear optical waveguide and the first extension optical waveguide to each other such that a second light of a second wavelength is coupled between the main nonlinear optical waveguide and the first extension optical waveguide; and
a second wavelength selective coupler that couples the main nonlinear optical waveguide and the second extension optical waveguide to each other such a third light of a third wavelength is coupled between the main nonlinear optical waveguide and the second extension optical waveguide.

17. The optical waveguide structure of claim 16, wherein the second light of the second wavelength travels in a second loop within the main nonlinear optical waveguide and the first extension optical waveguide in which the second loop has a second length for the second light of the second wavelength, and wherein the third light of the third wavelength travels in a third loop within the main nonlinear optical waveguide and the second extension optical waveguide in which the third loop has a third length for the third light of the third wavelength.

18. The optical waveguide structure of claim 16, wherein the first wavelength selective coupler is a starting first extension wavelength selective coupler located at a first extension starting location in the main nonlinear optical waveguide and the first extension optical waveguide and the second wavelength selective coupler is a starting second extension wavelength selective coupler located at a second extension starting location in the main nonlinear optical waveguide and the second extension optical waveguide, the optical waveguide structure further comprising:
an ending first extension wavelength selective coupler located in an ending first extension location in the main nonlinear optical waveguide and the first extension optical waveguide; and
an ending second extension wavelength selective coupler located at an ending second extension location in the main nonlinear optical waveguide and the second extension optical waveguide.

19. The optical waveguide structure of claim 1 further comprising:
a set of electrodes in a location selected from at least one of adjacent to the first side region, adjacent to the second side region, adjacent to the central region.

20. The optical waveguide structure of claim 1, wherein the central region, the first side region and the second side region form a first core region and further comprising:
a second core region.

21. The optical waveguide structure of claim 20, wherein a gap is present between the first core region and the second core region.

22. A method for transmitting light through a nonlinear optical waveguide structure:
inputting a light at a pump wavelength into the nonlinear optical waveguide structure having a central region within a nonlinear optical waveguide in nonlinear optical waveguide structure, wherein the central region comprises a nonlinear optical material, a first side region laterally adjacent to a first side of the central region and longitudinally parallel to the central region along the direction of propagation, and a second side region laterally adjacent to a second side of the central region and longitudinally parallel to the central region along the direction of propagation, wherein the central region has a first nonlinear coefficient that is larger than a second nonlinear coefficient of the first side region and the second side region; and propagating the light at the pump wavelength along a path in the optical waveguide structure, wherein light generation occurs in the nonlinear optical waveguide.

23. The method of claim 22, wherein the central region has a set of dimensions selected to increase a light generation in the optical waveguide structure.

24. The method of claim 23, wherein the light generation increases for at least one of a signal light and an idler light when a pump light overlaps the central region of the nonlinear optical waveguide.

25. The method of claim 23, wherein the set of dimensions is a width selected to increase an overlap of an electromagnetic field has a first sign for a light of interest with the central region and the electromagnetic field for the light of interest has a second sign in the first side region and the second side region such that light generation is increased within the nonlinear optical waveguide.

26. The method of claim 23, wherein the set of dimensions is selected from least one of a width or a height.

* * * * *